(12) United States Patent
Sasaki et al.

(10) Patent No.: US 8,701,273 B2
(45) Date of Patent: Apr. 22, 2014

(54) METHOD OF MANUFACTURING MAGNETIC HEAD FOR PERPENDICULAR MAGNETIC RECORDING HAVING A RETURN PATH SECTION

(75) Inventors: Yoshitaka Sasaki, Santa Clara, CA (US); Hiroyuki Ito, Milpitas, CA (US); Hironori Araki, Milpitas, CA (US); Seiichiro Tomita, Milpitas, CA (US); Kazuki Sato, Milpitas, CA (US); Shigeki Tanemura, Milpitas, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 203 days.

(21) Appl. No.: 13/456,932

(22) Filed: Apr. 26, 2012

(65) Prior Publication Data
US 2013/0283601 A1    Oct. 31, 2013

(51) Int. Cl.
| | | |
|---|---|---|
| *G11B 5/127* | (2006.01) | |
| *H04R 31/00* | (2006.01) | |
| *G11B 5/265* | (2006.01) | |
| *G11B 5/31* | (2006.01) | |
| *G11B 5/17* | (2006.01) | |

(52) U.S. Cl.
CPC ............ *G11B 5/1278* (2013.01); *G11B 5/1276* (2013.01); *G11B 5/265* (2013.01); *G11B 5/2651* (2013.01); *G11B 5/2658* (2013.01); *G11B 5/3116* (2013.01); *G11B 5/3123* (2013.01); *G11B 5/315* (2013.01); *G11B 5/3153* (2013.01); *G11B 5/3163* (2013.01); *G11B 5/17* (2013.01)
USPC .................. 29/603.13; 29/603.14; 29/603.15; 29/603.16; 29/603.18; 360/125.02; 360/125.03; 360/125.1; 360/125.12; 360/125.15

(58) Field of Classification Search
CPC .... G11B 5/127; G11B 5/1278; G11B 5/1276; G11B 5/265; G11B 5/2651; G11B 5/2658; G11B 5/3116; G11B 5/3123; G11B 5/315; G11B 5/3153; G11B 5/3163; G11B 5/3146; G11B 5/17; G11B 11/00
USPC ............... 29/603.11, 603.13–603.16, 603.18; 360/123.03, 123.06, 123.1, 125.02, 360/125.16, 125.17, 125.3
See application file for complete search history.

(56) References Cited

U.S. PATENT DOCUMENTS

| | | | |
|---|---|---|---|
| 6,954,340 B2 | 10/2005 | Shukh et al. | |
| 7,443,633 B2 * | 10/2008 | Tagami et al. | ............. 360/125.5 |

(Continued)

OTHER PUBLICATIONS

U.S. Appl. No. 13/456,914, filed Apr. 26, 2012 in the name of Yoshitaka Sasaki et al.

*Primary Examiner* — Paul D Kim
(74) *Attorney, Agent, or Firm* — Oliff PLC

(57) ABSTRACT

A method of manufacturing a magnetic head includes the step of forming an accommodation part and the step of forming a return path section. The return path section lies between a main pole and a top surface of a substrate, and connects a shield and part of the main pole away from a medium facing surface to each other so that a space through which part of a coil passes is defined. The accommodation part accommodates at least part of the return path section. The step of forming the return path section forms first to third portions simultaneously. The first portion is located closer to the top surface of the substrate than is the space. The second portion is located closer to the medium facing surface than is the space. The third portion is located farther from the medium facing surface than is the space.

10 Claims, 33 Drawing Sheets

(56) References Cited

U.S. PATENT DOCUMENTS

| | | | |
|---|---|---|---|
| 8,345,381 B1 * | 1/2013 | Sasaki et al. | 360/123.03 |
| 8,385,019 B1 * | 2/2013 | Sasaki et al. | 360/123.03 |
| 8,416,528 B1 * | 4/2013 | Sasaki et al. | 360/125.02 |
| 8,441,755 B2 * | 5/2013 | Sasaki et al. | 360/123.03 |
| 8,493,821 B1 * | 7/2013 | Sasaki et al. | 369/13.33 |
| 2005/0128637 A1 | 6/2005 | Johnston et al. | |

* cited by examiner

METHOD OF MANUFACTURING MAGNETIC HEAD FOR PERPENDICULAR MAGNETIC RECORDING HAVING A RETURN PATH SECTION

BACKGROUND OF THE INVENTION

1. Field of the Invention

The present invention relates to a method of manufacturing a magnetic head for perpendicular magnetic recording that is used for writing data on a recording medium by means of a perpendicular magnetic recording system, and more specifically, to a method of manufacturing a magnetic head for perpendicular magnetic recording that has a main pole, a shield, and a return path section.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head section having a magnetoresistive element (hereinafter, also referred to as MR element) for reading and a write head section having an induction-type electromagnetic transducer for writing are stacked on the top surface of a substrate. The write head section includes a main pole that produces a write magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head section of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium.

Here, the side of positions closer to the leading end relative to a reference position will be defined as the leading side, and the side of positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For higher recording densities, it is necessary to prevent adjacent track erasure.

Providing a write shield near the main pole is effective for preventing adjacent track erasure induced by the skew mentioned above and increasing the recording density. For example, U.S. Pat. No. 6,954,340 B2 and U.S. Patent Application Publication No. 2005/0128637 A1 describe a magnetic head including a write shield having an end face that is located in the medium facing surface to wrap around an end face of the main pole.

A magnetic head including a write shield is typically provided with one or more return path sections for connecting the write shield to a part of the main pole away from the medium facing surface. The write shield and the one or more return path sections have the function of capturing a magnetic flux that is produced from the end face of the main pole and spreads in directions other than the direction perpendicular to the plane of the recording medium, so as to prevent the magnetic flux from reaching the recording medium. The write shield and the one or more return path sections also have the function of allowing a magnetic flux that has been produced from the end face of the main pole and has magnetized the recording medium to flow back to the main pole. Thus, the magnetic head including the write shield makes it possible to prevent adjacent track erasure and allows a further improvement of the recording density.

U.S. Pat. No. 6,954,340 B2 and U.S. Patent Application Publication No. 2005/0128637 A1 each disclose a magnetic head including, as the aforementioned one or more return path sections, a return path section located on the trailing side relative to the main pole and a return path section located on the leading side relative to the main pole.

Now, a method of forming the return path section located on the leading side relative to the main pole (hereinafter, referred to as the leading return path section) will be contemplated. In a magnetic head, the read head section and the write head section stacked on the top surface of the substrate are typically located on the trailing side relative to the top surface of the substrate. In this case, the leading return path section lies between the main pole and the top surface of the substrate. The main pole and the leading return path section define a space through which a portion of a coil passes. In such a magnetic head, the leading return path section is typically configured to have a first layer, a second layer formed on the first layer at a position near the medium facing surface, and a third layer formed on the first layer at a position away from the medium facing surface. The second layer connects a part of the first layer located near the medium facing surface to the write shield. The third layer connects a part of the first layer located away from the medium facing surface to a part of the main pole located away from the medium facing surface.

In the magnetic head shown in FIG. 8 of U.S. Patent Application Publication No. 2005/0128637 A1, a return pole located on the leading side relative to the main pole corresponds to the aforementioned first layer, a shorting shield located on the leading side relative to the main pole corresponds to part of the write shield and the aforementioned second layer, and a back via located on the leading side relative to the main pole corresponds to the aforementioned third layer.

To form the typical leading return path section described above, it is necessary to form the first layer into a predetermined shape first and then form the second and third layers into respective predetermined shapes. Thus, a number of steps are required to form the leading return path section.

OBJECT AND SUMMARY OF THE INVENTION

It is an object of the present invention to provide a method of manufacturing a magnetic head for perpendicular magnetic recording that makes it possible to form a return path section located on the rear side in the direction of travel of the recording medium relative to the main pole in a small number of steps.

A magnetic head for perpendicular magnetic recording that is manufactured by the manufacturing method of the present invention includes: a medium facing surface that faces a recording medium; a coil; a main pole; a write shield; a gap part; a first return path section made of a magnetic material; an accommodation part; and a substrate having a top surface. The coil produces a magnetic field corresponding to data to be written on the recording medium. The main pole has an end face located in the medium facing surface. The main pole allows a magnetic flux corresponding to the magnetic field produced by the coil to pass, and produces a write magnetic field for writing the data on the recording medium by means of a perpendicular magnetic recording system. The write shield is made of a magnetic material and has an end face located in the medium facing surface. The gap part is made of a nonmagnetic material and interposed between the main pole and the write shield. The accommodation part is made of a nonmagnetic material and accommodates at least part of the first return path section. The coil, the main pole, the write shield, the gap part, the first return path section, and the accommodation part are located above the top surface of the substrate.

The end face of the write shield includes: a first end face portion located on the front side in the direction of travel of the recording medium relative to the end face of the main pole; and a second end face portion located on the rear side in the direction of travel of the recording medium relative to the end face of the main pole. The first return path section is located on the rear side in the direction of travel of the recording medium relative to the main pole and lies between the main pole and the top surface of the substrate. The first return path section connects the write shield and part of the main pole away from the medium facing surface to each other so that a first space is defined by the main pole, the gap part, the write shield, and the first return path section. The coil includes at least one first coil element extending to pass through the first space.

The first return path section includes a magnetic layer including a first, a second, and a third portion. The first portion is located closer to the top surface of the substrate than is the first space. The second portion is located closer to the medium facing surface than is the first space. The third portion is located farther from the medium facing surface than is the first space.

The method of manufacturing the magnetic head for perpendicular magnetic recording of the present invention includes the steps of: forming the accommodation part; forming the first return path section after the accommodation part is formed; and forming the coil, the main pole, the write shield and the gap part after the first return path section is formed. The step of forming the first return path section forms the first to third portions from the same material simultaneously.

In the method of manufacturing the magnetic head for perpendicular magnetic recording of the present invention, the step of forming the first return path section may form the first to third portions by frame plating.

In the method of manufacturing the magnetic head for perpendicular magnetic recording of the present invention, the accommodation part may include an interposer interposed between the second portion and the medium facing surface. The interposer may have an inclined surface facing toward the second portion. The distance from the medium facing surface to an arbitrary point on the inclined surface decreases with increasing distance from the arbitrary point to the top surface of the substrate. The second portion may extend along the inclined surface. The interposer may be made of an inorganic insulating material. The inclined surface may form a first angle of 5° to 45° relative to a direction perpendicular to the top surface of the substrate. The second portion may have a first end face facing toward the medium facing surface and a second end face in contact with the write shield. The first end face may have an end located in the medium facing surface. In this case, when seen at the end of the first end face, the first end face may form a second angle greater than 90° relative to a part of the medium facing surface, the part of the medium facing surface being located on the front side in the direction of travel of the recording medium relative to the end of the first end face. The second angle may be equal to 180° minus the first angle, or may be smaller than 180° minus the first angle.

The magnetic head for perpendicular magnetic recording that is manufactured by the manufacturing method of the present invention may further include a second return path section located on the front side in the direction of travel of the recording medium relative to the main pole. The second return path section connects the write shield and part of the main pole away from the medium facing surface to each other so that a second space is defined by the main pole, the gap part, the write shield, and the second return path section. The coil may further include at least one second coil element extending to pass through the second space. In this case, the method of manufacturing the magnetic head for perpendicular magnetic recording of the present invention further includes the step of forming the second return path section after the main pole is formed.

In the method of manufacturing the magnetic head for perpendicular magnetic recording of the present invention, the end face of the write shield may further include a third end face portion and a fourth end face portion. The third end face portion and the fourth end face portion may be located on opposite sides of the end face of the main pole in the track width direction.

According to the method of manufacturing the magnetic head for perpendicular magnetic recording of the present invention, the step of forming the first return path section forms the first to third portions from the same material simultaneously. Thus, the present invention allows the first return path section to be formed in a small number of steps.

Other objects, features and advantages of the present invention will become fully apparent from the following description.

DETAILED DESCRIPTION OF THE PREFERRED EMBODIMENTS

First Embodiment

Figure 1:
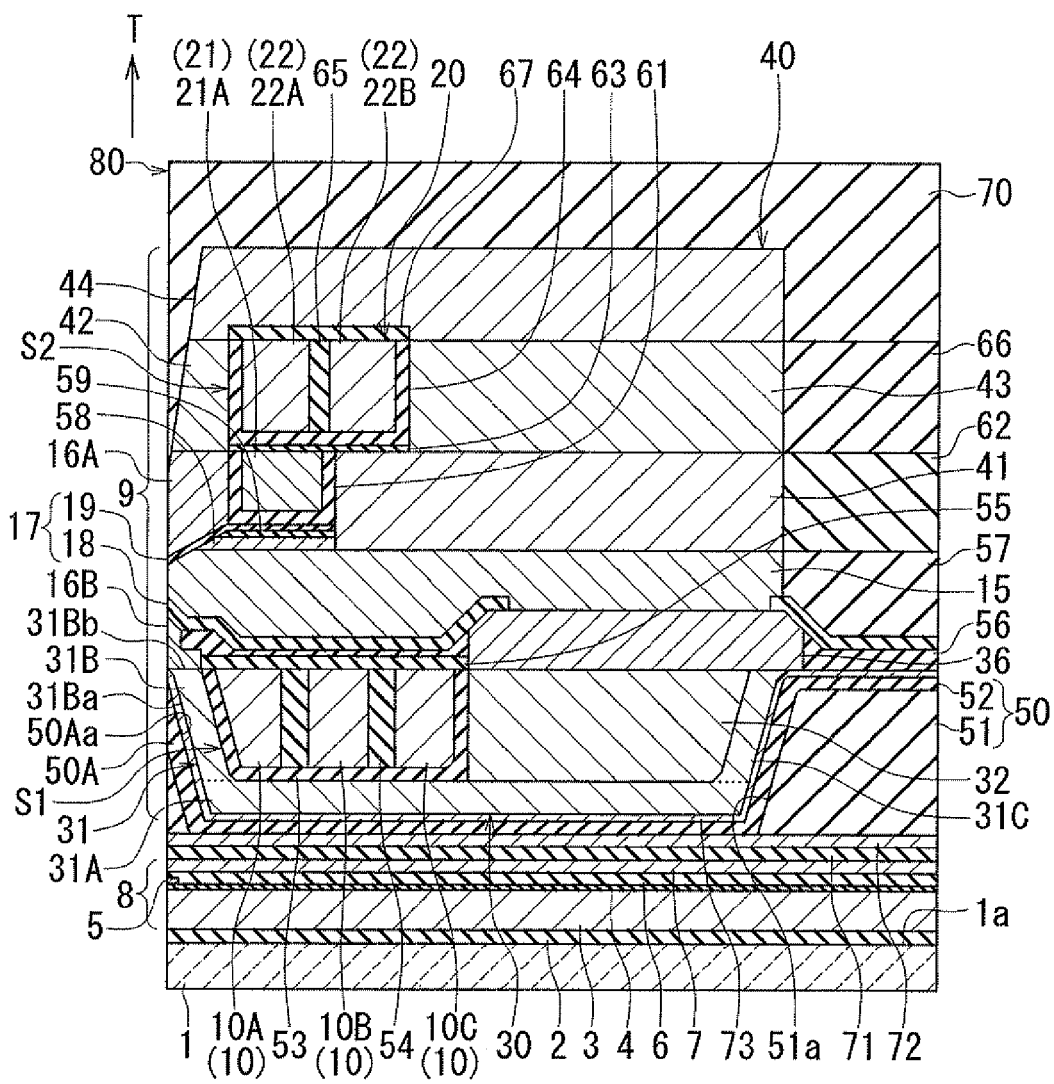
FIG. 1 is a cross-sectional view of a magnetic head according to a first embodiment of the invention.
Figure 2:
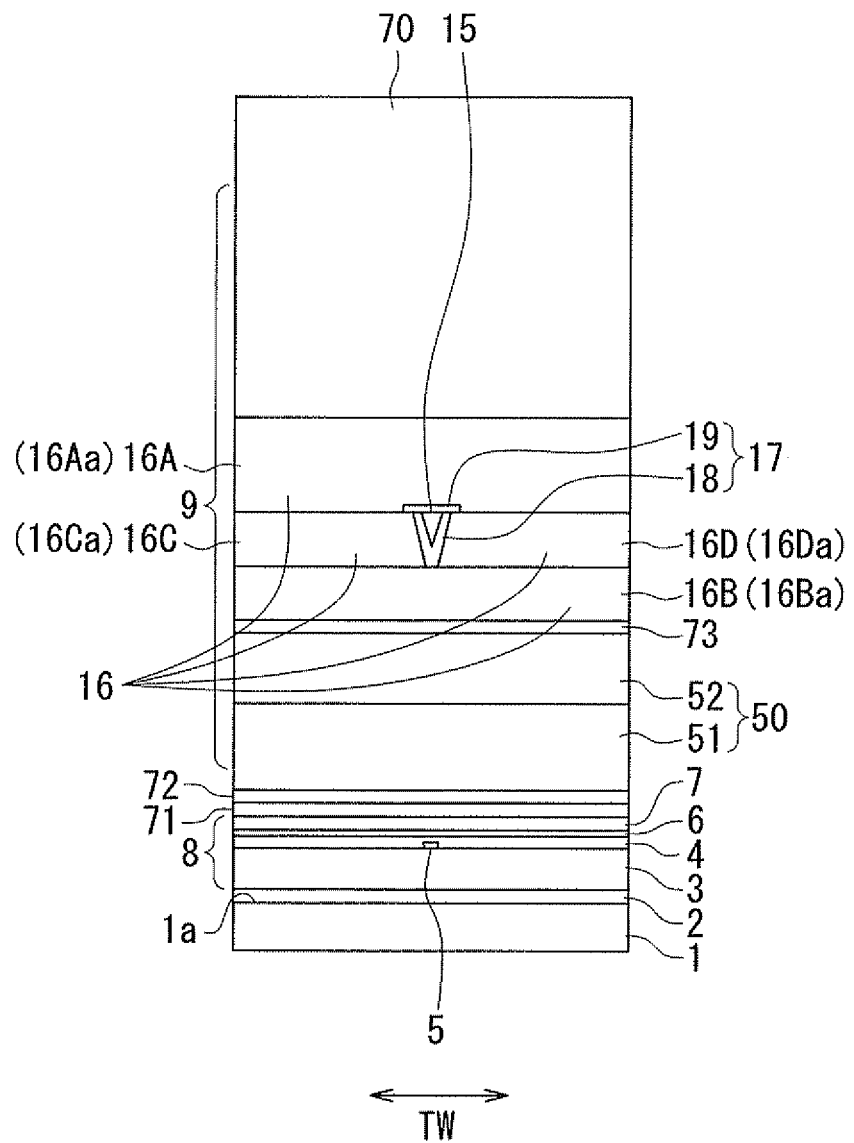
FIG. 2 is a front view showing the medium facing surface of the magnetic head according to the first embodiment of the invention.
Figure 3:
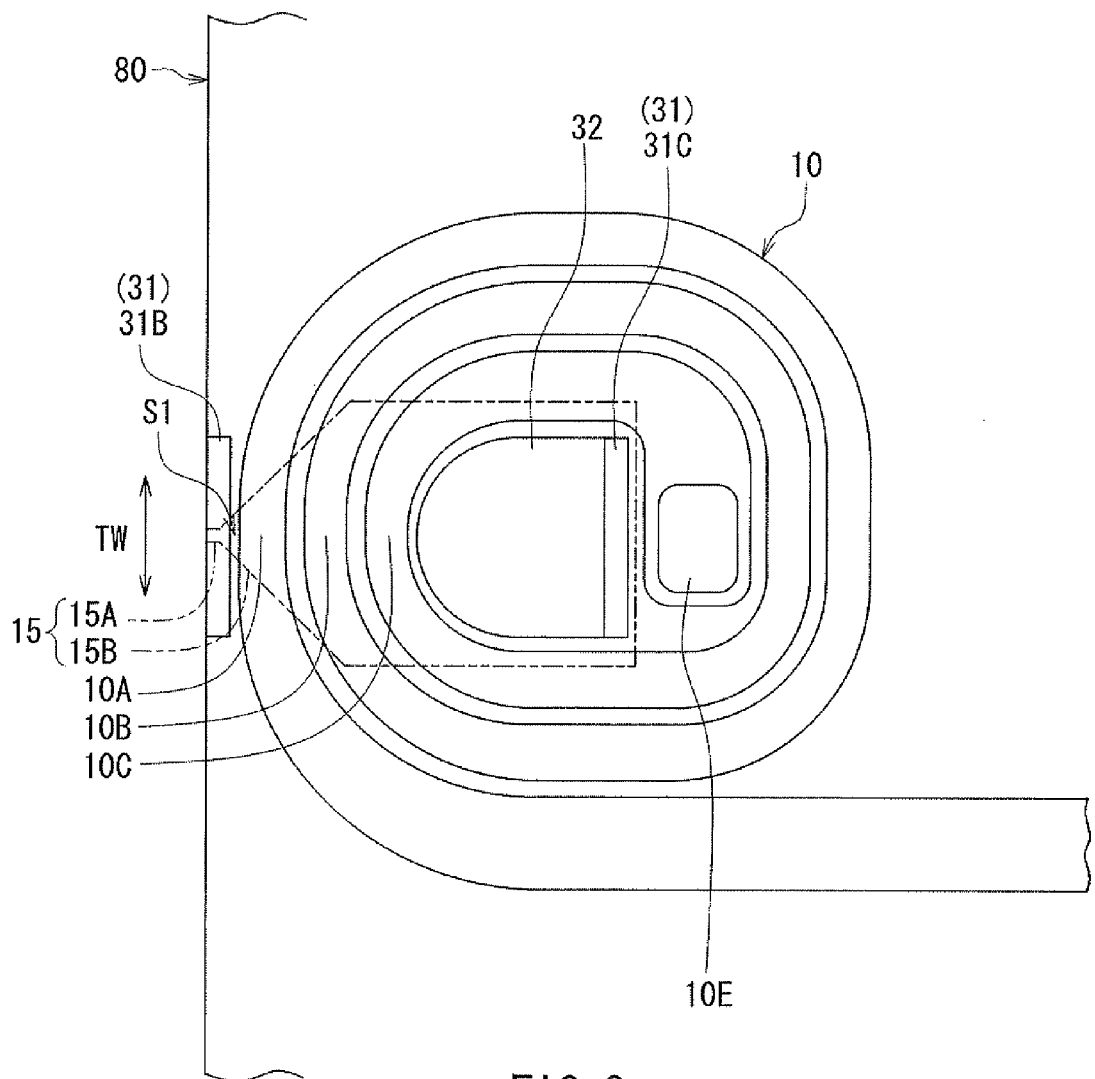
FIG. 3 is a plan view showing a first portion of a coil of the magnetic head according to the first embodiment of the invention.
Figure 4:
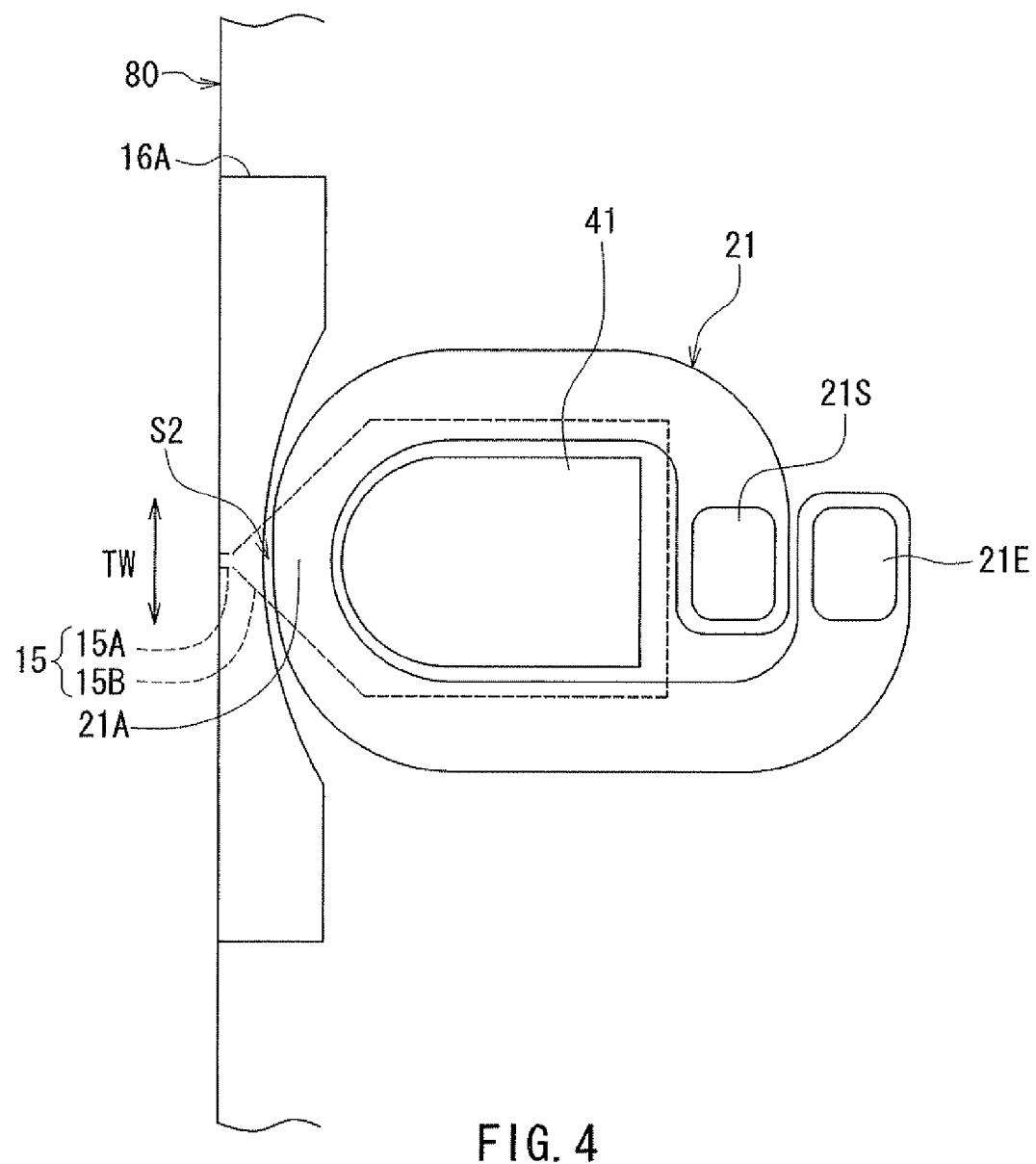
FIG. 4 is a plan view showing a first layer of a second portion of the coil of the magnetic head according to the first embodiment of the invention.
Figure 5:
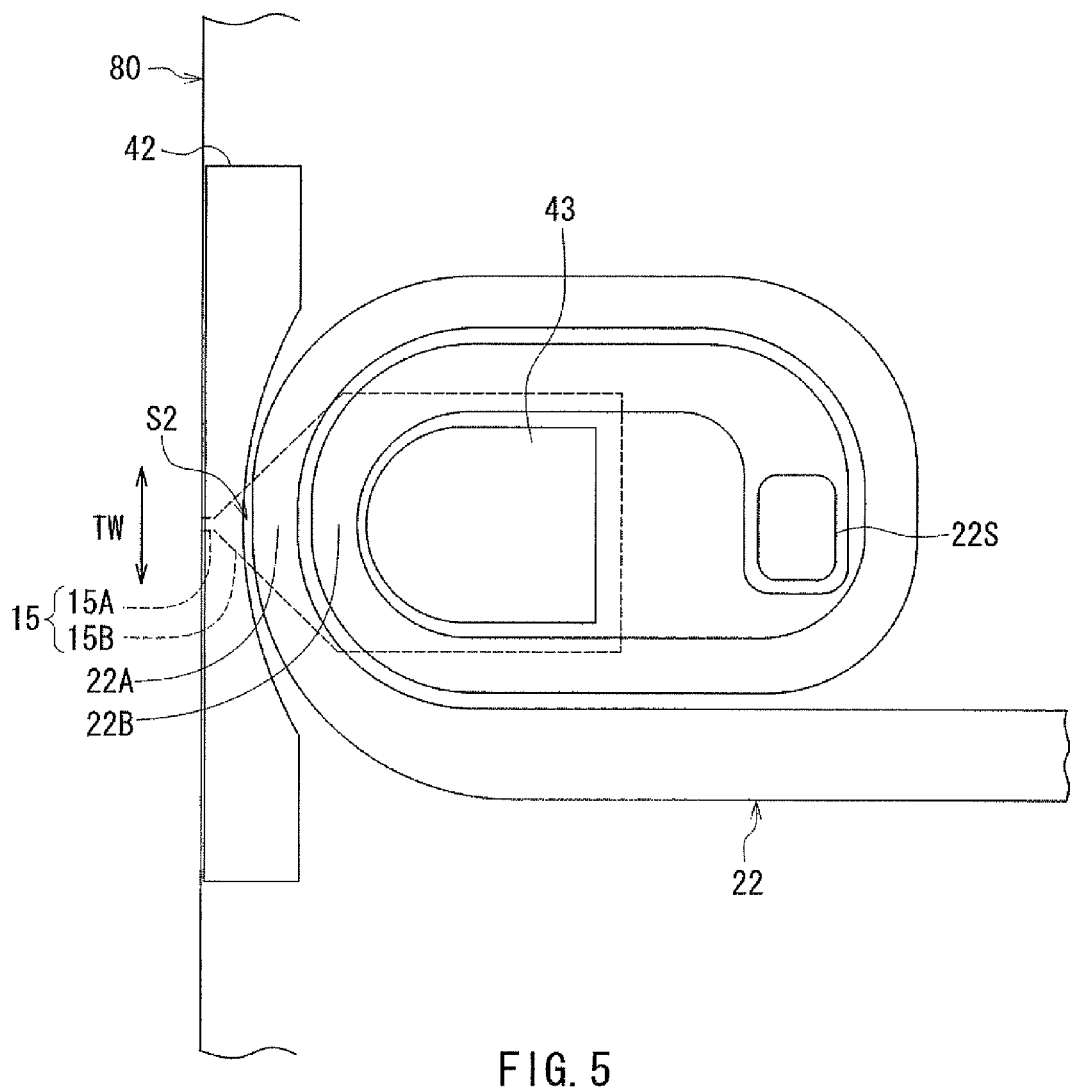
FIG. 5 is a plan view showing a second layer of the second portion of the coil of the magnetic head according to the first embodiment of the invention.
Figure 6:
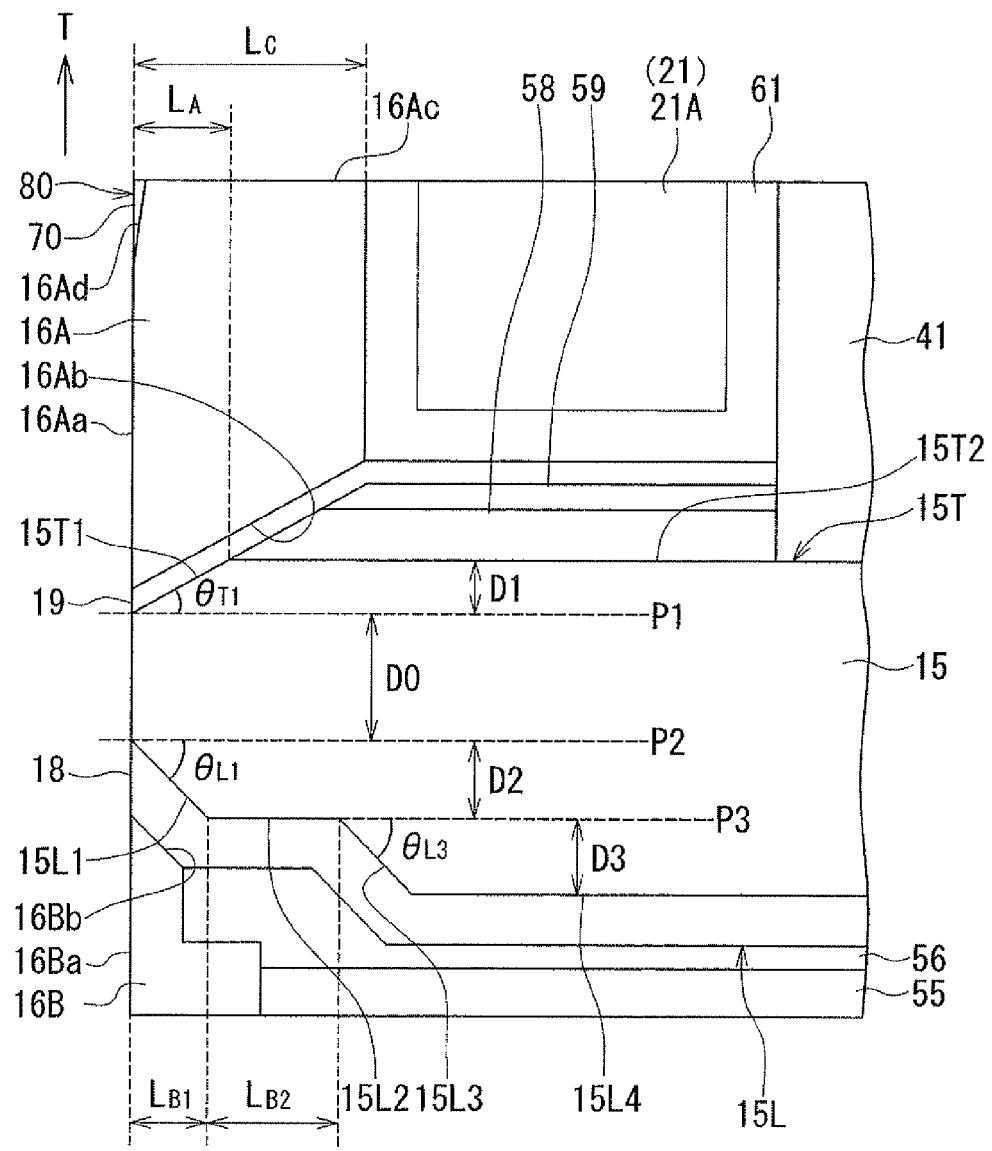
FIG. 6 is a cross-sectional view showing a part of a main pole in the vicinity of the medium facing surface in the magnetic head according to the first embodiment of the invention.

Embodiments of the present invention will now be described in detail with reference to the drawings. First, reference is made to FIG. 1 to FIG. 6 to describe the configuration of a magnetic head according to a first embodiment of the invention. FIG. 1 is a cross-sectional view of the magnetic head according to the present embodiment. FIG. 2 is a front view showing the medium facing surface of the magnetic head according to the present embodiment. FIG. 3 is a plan view showing a first portion of a coil of the magnetic head according to the present embodiment. FIG. 4 is a plan view showing a first layer of a second portion of the coil of the magnetic head according to the present embodiment. FIG. 5 is a plan view showing a second layer of the second portion of the coil of the magnetic head according to the present embodiment. FIG. 6 is a cross-sectional view showing a part of a main pole in the vicinity of the medium facing surface in the magnetic head according to the present embodiment. Note that FIG. 1 and FIG. 6 show cross sections perpendicular to the medium facing surface and to the top surface of the substrate. The arrows with the symbol T in FIG. 1 and FIG. 6 indicate the direction of travel of the recording medium. The arrows with the symbol TW in FIG. 2 to FIG. 5 indicate the track width direction.

As shown in FIG. 1 and FIG. 2, the magnetic head for perpendicular magnetic recording (hereinafter simply referred to as the magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 80 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes: a nonmagnetic layer 71 made of a nonmagnetic material and disposed on the second read shield layer 7; a middle shield layer 72 made of a magnetic material and disposed on the nonmagnetic layer 71; and a write head section 9 disposed on the middle shield layer 72. The middle shield layer 72 has the function of shielding the MR element 5 from magnetic fields generated in the write head section 9. The nonmagnetic layer 71 is made of alumina, for example. The write head section 9 includes a coil, a main pole 15, a write shield 16, and a gap part 17.

The coil produces a magnetic field corresponding to data to be written on the recording medium. The coil includes a first portion 10 and a second portion 20. The first portion 10 and the second portion 20 are both made of a conductive material such as copper. The first portion 10 and the second portion 20 are connected in series or in parallel. The main pole 15 has an end face located in the medium facing surface 80. The main pole 15 allows a magnetic flux corresponding to the magnetic field produced by the coil to pass, and produces a write magnetic field for writing data on the recording medium by means of a perpendicular magnetic recording system. FIG. 1 and FIG. 6 each show a cross section that intersects the end face of the main pole 15 located in the medium facing surface 80 and that is perpendicular to the medium facing surface 80 and to the top surface 1a of the substrate 1 (the cross section will hereinafter be referred to as the main cross section).

The write shield 16 has an end face located in the medium facing surface 80. The end face of the write shield 16 includes first to fourth end face portions 16Aa, 16Ba, 16Ca, and 16Da. The first end face portion 16Aa is located on the front side in the direction T of travel of the recording medium relative to the end face of the main pole 15. The second end face portion 16Ba is located on the rear side in the direction T of travel of the recording medium relative to the end face of the main pole 15. The third and fourth end face portions 16Ca and 16Da are located on opposite sides of the end face of the main pole 15 in the track width direction TW. In the medium facing surface 80, the first to fourth end face portions 16Aa, 16Ba, 16Ca, and 16Da are arranged to wrap around the end face of the main pole 15.

The write shield 16 is made of a magnetic material. Examples of materials that can be used for the write shield 16 include CoFeN, CoNiFe, NiFe, and CoFe.

The write head section 9 further includes a first return path section 30 and a second return path section 40. The first and second return path sections 30 and 40 are both made of a magnetic material. Examples of materials that can be used for the first and second return path sections 30 and 40 include CoFeN, CoNiFe, NiFe, and CoFe. The first return path section 30 and the second return path section 40 align along a direction perpendicular to the top surface 1a of the substrate 1 with the main pole 15 interposed therebetween. The first return path section 30 is located on the rear side in the direction T of travel of the recording medium relative to the main pole 15, and connects the write shield 16 and part of the main pole 15 away from the medium facing surface 80 to each other, thereby magnetically coupling the write shield 16 and the main pole 15 to each other. The second return path section 40 is located on the front side in the direction T of travel of the recording medium relative to the main pole 15, and connects the write shield 16 and part of the main pole 15 away from the medium facing surface 80 to each other, thereby magnetically coupling the write shield 16 and the main pole 15 to each other.

The first return path section 30 includes magnetic layers 31, 32 and 36. The magnetic layer 31 includes a first portion 31A, a second portion 31B and a third portion 31C. The first portion 31A extends in a direction parallel to the top surface 1a of the substrate 1. The second portion 31B extends from a part of the first portion 31A, the part being in the vicinity of the end of the first portion 31A closest to the medium facing surface 80, in the direction away from the top surface 1a of the substrate 1. The third portion 31C extends from a part of the first portion 31A, the part being in the vicinity of the end of the first portion 31A farthest from the medium facing surface 80, in the direction away from the top surface 1a of the substrate 1. In the main cross section mentioned above, the distance between the second portion 31B and the third portion 31C in the direction perpendicular to the medium facing surface 80 increases with increasing distance from the top surface 1a of the substrate 1. In FIG. 1, the boundary between the first portion 31A and the second portion 31B and the boundary between the first portion 31A and the third portion 31C are shown by dotted lines. The second portion 31B has a first end face 31Ba facing toward the medium facing surface 80 and a second end face 31Bb in contact with the write shield 16.

The magnetic layer 32 is in contact with the first and third portions 31A and 31C and lies between the second portion 31B and the third portion 31C with a gap between the second portion 31B and the magnetic layer 32. As shown in FIG. 3, the first portion 10 of the coil is wound approximately three turns around the third portion 31C and the magnetic layer 32.

The magnetic head further includes an accommodation part 50 made of a nonmagnetic material and accommodating at least part of the first return path section 30. In the present embodiment, the accommodation part 50 accommodates the magnetic layers 31 and 32, in particular. The accommodation part 50 includes a nonmagnetic layer 51 and a nonmagnetic film 52. The nonmagnetic layer 51 is disposed on the middle shield layer 72. The nonmagnetic layer 51 has an opening 51a that penetrates the nonmagnetic layer 51 from its top surface to bottom surface. The opening 51a has a first wall face located outside of the outermost turn of the first portion 10 and a second wall face located inside of the innermost turn of the first portion 10. The first and second wall faces are inclined relative to the direction perpendicular to the top surface 1a of the substrate 1. More specifically, in the main cross section, the distance from the medium facing surface 80 to an arbitrary point on the first wall face decreases with increasing distance from the arbitrary point to the top surface 1a of the substrate 1. In the main cross section, the distance from the medium facing surface 80 to an arbitrary point on the second wall face increases with increasing distance from the arbitrary point to the top surface 1a of the substrate 1.

The magnetic layers 31 and 32 and the first portion 10 are located in the opening 51a of the nonmagnetic layer 51. The nonmagnetic film 52 is disposed to extend along the top surface of the nonmagnetic layer 51, the first and second wall faces of the opening 51a, and the top surface of the middle shield layer 72. The nonmagnetic layer 51 and the nonmagnetic film 52 are each made of an inorganic insulating material such as alumina.

The accommodation part 50 includes an interposer 50A interposed between the first return path section 30 and the medium facing surface 80. The interposer 50A has an inclined surface 50Aa facing toward the first return path section 30. The distance from the medium facing surface 80 to an arbitrary point on the inclined surface 50Aa decreases with increasing distance from the arbitrary point to the top surface 1a of the substrate 1. The interposer 50A is composed of part of the nonmagnetic layer 51 and part of the nonmagnetic film 52. The second portion 31B extends along the inclined surface 50Aa.

The magnetic head further includes an electrode film 73 made of a nonmagnetic metal material and disposed along the nonmagnetic film 52. The electrode film 73 is used as an electrode and seed when the magnetic layer 31 is formed by plating. The electrode film 73 has a thickness in the range of 50 to 80 nm, for example. The electrode film 73 is made of Ru, for example.

The magnetic head further includes an insulating film 53 made of an insulating material and interposed between the first portion 10 and the magnetic layers 31 and 32, and an insulating layer 54 made of an insulating material and disposed in the space between every adjacent turns of the first portion 10. The top surfaces of the first portion 10, the magnetic layers 31 and 32, the insulating film 53, the insulating layer 54 and the electrode film 73 are even with each other. The insulating film 53 and the insulating layer 54 are made of alumina, for example.

As shown in FIG. 2, the write shield 16 includes a first shield 16A, a second shield 16B, and two side shields 16C and 16D. The two side shields 16C and 16D are located on opposite sides of the main pole 15 in the track width direction TW. The first shield 16A is located on the front side in the direction T of travel of the recording medium relative to the main pole 15. The second shield 16B is located on the rear side in the direction T of travel of the recording medium relative to the main pole 15. The side shields 16C and 16D magnetically couple the first shield 16A and the second shield 16B to each other.

As shown in FIG. 6, the first shield 16A includes: the first end face portion 16Aa; a first inclined surface 16Ab which is a bottom surface; a top surface 16Ac; and a connecting surface 16Ad which connects the first end face portion 16Aa and the top surface 16Ac to each other. The distance from the medium facing surface 80 to an arbitrary point on the connecting surface 16Ad increases with increasing distance from the arbitrary point to the top surface 1a of the substrate 1. The second shield 16B includes the second end face portion 16Ba, and a top surface including a second inclined surface 16Bb. The first inclined surface 16Ab and the second inclined surface 16Bb will be described in detail later. As shown in FIG. 2, the side shield 16C includes the third end face portion 16Ca. The side shield 16D includes the fourth end face portion 16Da.

The second shield 16B is disposed on the second portion 31B of the magnetic layer 31 and in contact with the second end face 31Bb of the second portion 31B. The magnetic layer 36 is disposed over the third portion 31C of the magnetic layer 31 and the magnetic layer 32. The magnetic head further includes: an insulating layer 55 made of an insulating material, disposed over the top surfaces of the first portion 10, the insulating film 53 and the insulating layer 54 and surrounding the second shield 16B and the magnetic layer 36; and a nonmagnetic layer 56 made of a nonmagnetic material and disposed over the insulating layer 55 and the electrode film 73. The insulating layer 55 and the nonmagnetic layer 56 are made of alumina, for example.

The main pole 15 has a top surface 15T (see FIG. 6), which is a surface located at an end on the front side in the direction T of travel of the recording medium, and a bottom end 15L (see FIG. 6) opposite to the top surface 15T. The main pole 15 further has first and second side parts (see FIG. 2) that are opposite to each other in the track width direction TW. The side shield 16C has a first sidewall opposed to the first side part of the main pole 15. The side shield 16D has a second sidewall opposed to the second side part of the main pole 15.

The gap part 17 is made of a nonmagnetic material and interposed between the main pole 15 and the write shield 16. The gap part 17 includes a first gap layer 19 interposed between the main pole 15 and the first shield 16A, and a second gap layer 18 interposed between the main pole 15 and each of the second shield 16B and the side shields 16C and 16D.

The side shields 16C and 16D are disposed on the second shield 16B and in contact with the top surface of the second shield 16B. The second gap layer 18 is arranged to extend along the sidewalls of the side shields 16C and 16D, the top surface of the second shield 16B and the top surface of the nonmagnetic layer 56. The nonmagnetic material employed to form the second gap layer 18 may be an insulating material or a nonmagnetic metal material. Alumina is an example of insulating materials that can be used to form the second gap layer 18. Ru is an example of nonmagnetic metal materials that can be used to form the second gap layer 18.

The main pole 15 is disposed over the second shield 16B and the nonmagnetic layer 56 such that the second gap layer 18 is interposed between the main pole 15 and the top surfaces of the second shield 16B and the nonmagnetic layer 56. As shown in FIG. 2, the second gap layer 18 is interposed also between the main pole 15 and each of the side shields 16C and 16D.

The bottom end 15L of the main pole 15 is in contact with the top surface of the magnetic layer 36 at a position away from the medium facing surface 80. The main pole 15 is made of a magnetic metal material. Examples of materials that can be used for the main pole 15 include NiFe, CoNiFe, and CoFe. The shape of the main pole 15 will be described in detail later.

The magnetic head further includes a nonmagnetic layer 57 made of a nonmagnetic material and disposed around the main pole 15 and the side shields 16C and 16D. The nonmagnetic layer 57 is made of alumina, for example.

The magnetic head further includes: a nonmagnetic metal layer 58 made of a nonmagnetic metal material and disposed on part of the top surface 15T of the main pole 15 at a position away from the medium facing surface 80; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58 and the insulating layer 59. The first gap layer 19 may be made of a nonmagnetic insulating material such as alumina or a nonmagnetic conductive material such as Ru, NiCu, Ta, W, NiB, or NiP.

The first shield 16A is disposed over the side shields 16C and 16D and the first gap layer 19, and is in contact with the top surfaces of the side shields 16C and 16D and the first gap layer 19. In the medium facing surface 80, part of the first end face portion 16Aa of the first shield 16A is spaced from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The second return path section 40 includes magnetic layers 41, 42, 43 and 44. The magnetic layer 41 is disposed on the main pole 15 at a position away from the medium facing surface 80.

The second portion 20 of the coil includes a first layer 21 and a second layer 22. As shown in FIG. 4, the first layer 21 is wound one turn around the magnetic layer 41. The magnetic head further includes an insulating film 61 made of an insulating material and interposed between the first layer 21 and each of the first shield 16A, the first gap layer 19 and the magnetic layer 41, and a nonmagnetic layer 62 made of a nonmagnetic material and disposed around the first layer 21, the first shield 16A and the magnetic layer 41. The insulating film 61 and the nonmagnetic layer 62 are made of alumina, for example. The top surfaces of the first shield 16A, the first layer 21, the magnetic layer 41, the insulating film 61 and the nonmagnetic layer 62 are even with each other.

The magnetic head further includes an insulating layer 63 made of an insulating material and disposed over the top surfaces of the first layer 21 and the insulating film 61 and part of the top surface of the magnetic layer 41. The insulating layer 63 is made of alumina, for example.

The magnetic layer 42 is disposed on the first shield 16A. The magnetic layer 43 is disposed on the magnetic layer 41. The magnetic layer 42 has an end face facing toward the medium facing surface 80. This end face is located at a distance from the medium facing surface 80. The distance from the medium facing surface 80 to an arbitrary point on the end face of the magnetic layer 42 increases with increasing distance from the arbitrary point to the top surface 1a of the substrate 1.

As shown in FIG. 5, the second layer 22 is wound approximately two turns around the magnetic layer 43. The magnetic head further includes an insulating film 64 made of an insulating material and interposed between the second layer 22 and each of the magnetic layers 42 and 43 and the insulating layer 63, an insulating layer 65 made of an insulating material and disposed in the space between adjacent turns of the second layer 22, and an insulating layer 66 made of an insulating material and disposed around the second layer 22 and the magnetic layers 42 and 43. The top surfaces of the second layer 22, the magnetic layers 42 and 43, the insulating film 64 and the insulating layers 65 and 66 are even with each other. The magnetic head further includes an insulating layer 67 made of an insulating material and disposed over the top surfaces of the second layer 22, the insulating film 64 and the insulating layer 65. The insulating film 64 and the insulating layers 65 to 67 are made of alumina, for example.

The magnetic layer 44 is disposed over the magnetic layers 42 and 43 and the insulating layer 67, and connects the magnetic layer 42 and the magnetic layer 43 to each other. The magnetic layer 44 has an end face facing toward the medium facing surface 80. This end face is located at a distance from the medium facing surface 80. The distance from the medium facing surface 80 to an arbitrary point on the end face of the magnetic layer 44 increases with increasing distance from the arbitrary point to the top surface 1a of the substrate 1.

The magnetic head further includes a protective layer 70 made of a nonmagnetic material and disposed to cover the write head section 9. The protective layer 70 is made of, for example, an inorganic insulating material such as alumina.

As has been described, the magnetic head according to the present embodiment includes the medium facing surface 80, the read head section 8, and the write head section 9. The medium facing surface 80 faces the recording medium. The read head section 8 and the write head section 9 are stacked on the substrate 1. The read head section 8 is located on the rear side in the direction T of travel of the recording medium (i.e., located on the leading side) relative to the write head section 9. The read head section 8 includes: the MR element 5 serving as the read element; the first read shield layer 3 and the second read shield layer 7 for shielding the MR element 5, with their respective portions near the medium facing surface 80 opposed to each other with the MR element 5 therebetween; the first read shield gap film 4 disposed between the MR element 5 and the first read shield layer 3; and the second read shield gap film 6 disposed between the MR element 5 and the second read shield layer 7.

The write head section 9 includes the coil including the first and second portions 10 and 20, the main pole 15, the write shield 16, the gap part 17, the first and second return path sections 30 and 40, and the accommodation part 50. The coil, the main pole 15, the write shield 16, the gap part 17, the first return path section 30, the second return path section 40 and the accommodation part 50 are located above the top surface 1a of the substrate 1. The write shield 16 includes the first shield 16A, the second shield 16B, and the two side shields 16C and 16D. The gap part 17 includes the first gap layer 19 and the second gap layer 18. The first return path section 30 and the second return path section 40 align along the direction perpendicular to the top surface 1a of the substrate 1 with the main pole 15 interposed therebetween.

The first return path section 30 includes the magnetic layers 31, 32 and 36. The first return path section 30 is located on the rear side in the direction T of travel of the recording medium relative to the main pole 15 and lies between the main pole 15 and the top surface 1a of the substrate 1. As shown in FIG. 1, the first return path section 30 connects the write shield 16 and part of the main pole 15 away from the medium facing surface 80 to each other so that a first space S1 is defined by the main pole 15, the gap part 17 (the gap layer 18), the write shield 16 and the first return path section 30 (the magnetic layers 31, 32 and 36).

The accommodation part 50 accommodates at least part of the first return path section 30. More specifically, the magnetic layers 31 and 32 constituting part of the first return path section 30 are disposed in the opening 51a of the nonmagnetic layer 51 forming the accommodation part 50. The magnetic layer 31 includes the first to third portions 31A, 31B and 31C. The first portion 31A is located closer to the top surface 1a of the substrate 1 than is the first space S1. The second portion 31B is located closer to the medium facing surface 80 than is the first space S1. The third portion 31C is located farther from the medium facing surface 80 than is the first space S1.

The second return path section 40 includes the magnetic layers 41 to 44, and is located on the front side in the direction T of travel of the recording medium relative to the main pole 15. The second return path section 40 connects the write shield 16 and part of the main pole 15 away from the medium facing surface 80 to each other so that a second space S2 is defined by the main pole 15, the gap part 17 (the gap layer 19), the write shield 16 and the second return path section 40 (the magnetic layers 41 to 44).

The first and second portions 10 and 20 of the coil will now be described in detail with reference to FIG. 3 to FIG. 5. FIG. 3 is a plan view showing the first portion 10. As previously mentioned, the first portion 10 is wound approximately three turns around the third portion 31C and the magnetic layer 32. The first portion 10 includes three coil elements 10A, 10B and 10C extending to pass through the first space S1. Note that the coil elements refer to part of the coil winding. The coil elements 10A, 10B and 10C align in this order in the direction perpendicular to the medium facing surface 80, the coil element 10A being closest to the medium facing surface 80. The first portion 10 has a coil connection part 10E electrically connected to the second portion 20.

FIG. 4 is a plan view showing the first layer 21 of the second portion 20. As previously mentioned, the first layer 21 is wound one turn around the magnetic layer 41. The first layer 21 includes a coil element 21A extending to pass between the first shield 16A and the magnetic layer 41, in particular, within the second space S2. The first layer 21 has a coil connection part 21S electrically connected to the coil connection part 10E of the first portion 10, and a coil connection part 21E electrically connected to the second layer 22. The coil connection part 21S is electrically connected to the coil connection part 10E via a connection layer of columnar shape (not shown) that penetrates a plurality of layers interposed between the first layer 21 and the first portion 10. The connection layer is made of a conductive material such as copper.

FIG. 5 is a plan view showing the second layer 22 of the second portion 20. As previously mentioned, the second layer 22 is wound approximately two turns around the magnetic layer 43. The second layer 22 includes two coil elements 22A and 22B extending to pass between the magnetic layer 42 and the magnetic layer 43, in particular, within the second space S2. The coil elements 22A and 22B align in this order in the direction perpendicular to the medium facing surface 80, the coil element 22A being closer to the medium facing surface 80. The second layer 22 has a coil connection part 22S penetrating the insulating layer 63 and the insulating film 64 and electrically connected to the coil connection part 21E of the first layer 21. In the example shown in FIG. 3 to FIG. 5, the first and second portions 10 and 20 are connected in series.

The coil elements 21A, 22A and 22B extend to pass through the second space S2. Hereinafter, the coil elements extending to pass through the first space S1 will also be referred to as the first coil elements, and the coil elements extending to pass through the second space S2 will also be referred to as the second coil elements.

The shape of the main pole 15 will now be described in detail with reference to FIG. 3 to FIG. 6. As shown in FIG. 3 to FIG. 5, the main pole 15 includes a track width defining portion 15A and a wide portion 15B. The track width defining portion 15A has an end face located in the medium facing surface 80, and an end opposite to the end face. The wide portion 15B is connected to the end of the track width defining portion 15A. As shown in FIG. 6, the main pole 15 has: the top surface 15T which is the surface located at the end on the front side in the direction T of travel of the recording medium; the bottom end 15L opposite to the top surface 15T; the first side part; and the second side part. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 80. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 80, then becoming constant. Here, the length of the track width defining portion 15A in the direction perpendicular to the medium facing surface 80 will be referred to as the neck height. The neck height falls within the range of 0 to 0.3 µm, for example. A zero neck height means that no track width defining portion 15A exists and an end face of the wide portion 15B is thus located in the medium facing surface 80.

The top surface 15T includes a first portion 15T1 and a second portion 15T2 contiguously arranged in this order, the first portion 15T1 being closer to the medium facing surface 80. The first portion 15T1 has a first end located in the medium facing surface 80 and a second end opposite to the first end. The second portion 15T2 is connected to the second end of the first portion 15T1.

The bottom end 15L includes a first portion 15L1, a second portion 15L2, a third portion 15L3, and a fourth portion 15L4 contiguously arranged in this order, the first portion 15L1 being closest to the medium facing surface 80. The first portion 15L1 has a first end located in the medium facing surface 80 and a second end opposite to the first end. The second portion 15L2 is connected to the second end of the first portion 15L1. The third portion 15L3 has a third end connected to the second portion 15L2 and a fourth end that is located farther from the medium facing surface 80 than is the third end. Each of the first to third portions 15L1 to 15L3 may be an edge formed by two intersecting planes, or may be a plane connecting two planes to each other. The fourth portion 15L4 is a plane connected to the fourth end of the third portion 15L3.

Here, as shown in FIG. 6, assume a first virtual plane P1 and a second virtual plane P2. The first virtual plane P1 passes through the first end of the first portion 15T1 of the top surface 15T and is perpendicular to the medium facing surface 80 and to the direction T of travel of the recording medium. The second virtual plane P2 passes through the first end of the first portion 15L1 of the bottom end 15L and is perpendicular to the medium facing surface 80 and to the direction T of travel of the recording medium. The second portion 15T2 of the top surface 15T is substantially parallel to the first and second virtual planes P1 and P2. The first portion 15T1 is inclined relative to the first and second virtual planes P1 and P2 and the medium facing surface 80 such that the second end of the first portion 15T1 is located on the front side in the direction T of travel of the recording medium relative to the first end of the first portion 15T1.

The first portion 15L1 of the bottom end 15L is inclined relative to the first and second virtual planes P1 and P2 and the medium facing surface 80 such that the second end of the first portion 15L1 is located on the rear side in the direction T of travel of the recording medium relative to the first end of the first portion 15L1. The second and fourth portions 15L2 and 15L4 are substantially parallel to the first and second virtual planes P1 and P2. The third portion 15L3 is inclined relative to the first and second virtual planes P1 and P2 and the medium facing surface 80 such that the fourth end of the third portion 15L3 is located on the rear side in the direction T of travel of the recording medium relative to the third end of the third portion 15L3.

The first shield 16A of the write shield 16 has the first inclined surface 16Ab which is the bottom surface. The first inclined surface 16Ab includes a portion that is opposed to the first portion 15T1 of the top surface 15T with the first gap layer 19 of the gap part 17 interposed therebetween. The first inclined surface 16Ab is inclined relative to the first and second virtual planes P1 and P2 and the medium facing surface 80.

The second shield 16B of the write shield 16 includes a portion interposed between the third portion 15L3 of the bottom end 15L and the medium facing surface 80. The second shield 16B has the top surface including the second inclined surface 16Bb. The second inclined surface 16Bb is inclined relative to the first and second virtual planes P1 and P2 and the medium facing surface 80.

The top surface of the second shield 16B further includes a flat portion and a connecting surface. The flat portion is located farther from the medium facing surface 80 than is the second inclined surface 16Bb and closer to the top surface 1a of the substrate 1 than is the second inclined surface 16Bb. The connecting surface connects the second inclined surface 16Bb and the flat portion to each other. The flat portion is substantially parallel to the first and second virtual planes P1 and P2.

Here, as shown in FIG. 6, the length of the first portion 15T1 of the top surface 15T in the direction perpendicular to the medium facing surface 80 will be represented by the symbol $L_A$, the length of the first portion 15L1 of the bottom end 15L in the direction perpendicular to the medium facing surface 80 will be represented by the symbol $L_{B1}$, the length of the second portion 15L2 of the bottom end 15L in the direction perpendicular to the medium facing surface 80 will be represented by the symbol $L_{B2}$, and the length of the first inclined surface 16Ab in the direction perpendicular to the medium facing surface 80 will be represented by the symbol $L_C$. The length $L_A$ falls within the range of 0.05 to 0.15 µm, for example. The length $L_{B1}$ falls within the range of 0.1 to 0.5 µm, for example. The length $L_{B2}$ falls within the range of 0.2 to 0.6 µm, for example. The length $L_C$ falls within the range of 0.2 to 0.6 µm, for example. Note that the neck height can be set to any value independently of the lengths $L_A$, $L_{B1}$, $L_{B2}$ and $L_C$ mentioned above.

The angle of inclination of the first portion 15T1 of the top surface 15T relative to the first virtual plane P1 will be represented by the symbol $\theta_{T1}$, and the angle of inclination of the first portion 15L1 of the bottom end 15L relative to the second virtual plane P2 will be represented by the symbol $\theta_{L1}$. The angle of inclination $\theta_{T1}$ falls within the range of 22° to 35°, for example. The angle of inclination $\theta_{L1}$ falls within the range of 30° to 50°, for example.

Assume also a virtual plane P3 that passes through the third end of the third portion 15L3 of the bottom end 15L and is parallel to the first and second virtual planes P1 and P2. The angle of inclination of the third portion 15L3 relative to the virtual plane P3 will be represented by the symbol $\theta_{L3}$. The angle of inclination $\theta_{L3}$ falls within the range of 22° to 60°, for example.

The thickness of the main pole 15 in the medium facing surface 80, i.e., the distance between the first virtual plane P1 and the second virtual plane P2, will be represented by the symbol D0. The distance between the second portion 15T2 of the top surface 15T and the first virtual plane P1 will be represented by the symbol D1. The distance between the second portion 15L2 of the bottom end 15L and the second virtual plane P2 will be represented by the symbol D2. The distance between the fourth portion 15L4 and the virtual plane P3 will be represented by the symbol D3. The distance D0 falls within the range of 0.05 to 0.1 µm, for example. The distance D1 falls within the range of 0.02 to 0.1 µm, for example. The distance D2 falls within the range of 0.1 to 0.5 µm, for example. The distance D3 falls within the range of 0.1 to 0.5 µm, for example.

The end face of the main pole 15 located in the medium facing surface 80 has a first side adjacent to the first gap layer 19, a second side connected to one end of the first side, and a third side connected to the other end of the first side. The first side defines the track width. The position of an end of a record bit to be recorded on the recording medium depends on the position of the first side. The end face of the main pole 15 located in the medium facing surface 80 decreases in width in the track width direction TW with increasing distance from the first side, that is, with increasing distance from the first virtual plane P1. Each of the second side and the third side forms an angle of, for example, 7° to 17°, or preferably 10° to 15°, relative to a direction perpendicular to the first virtual plane P1. The first side has a length in the range of 0.05 to 0.20 µm, for example.

The function and effects of the magnetic head according to the present embodiment will now be described. The magnetic head writes data on the recording medium by using the write head section 9 and reads data stored on the recording medium by using the read head section 8. In the write head section 9, the coil including the first and second portions 10 and 20 produces magnetic fields corresponding to data to be written on the recording medium. A magnetic flux corresponding to the magnetic field produced by the first portion 10 passes through the first return path section 30 and the main pole 15. A magnetic flux corresponding to the magnetic field produced by the second portion 20 passes through the second return path section 40 and the main pole 15. Consequently, the main pole 15 allows the magnetic flux corresponding to the magnetic field produced by the first portion 10 and the magnetic flux corresponding to the magnetic field produced by the second portion 20 to pass.

The first and second portions 10 and 20 may be connected in series or in parallel. In either case, the first and second portions 10 and 20 are connected such that the magnetic flux corresponding to the magnetic field produced by the first portion 10 and the magnetic flux corresponding to the magnetic field produced by the second portion 20 flow in the same direction through the main pole 15.

The main pole 15 allows the magnetic fluxes corresponding to the magnetic fields produced by the coil to pass as mentioned above, and produces a write magnetic field for writing data on the recording medium by means of the perpendicular magnetic recording system.

The write shield 16 captures a disturbance magnetic field applied to the magnetic head from the outside thereof. This makes it possible to prevent erroneous writing on the recording medium induced by the disturbance magnetic field intensively captured into the main pole 15. The write shield 16 also has the function of capturing a magnetic flux produced from the end face of the main pole 15 and spreading in directions other than the direction perpendicular to the plane of the recording medium, so as to prevent the magnetic flux from reaching the recording medium.

Furthermore, the write shield 16 and the first and second return path sections 30 and 40 have the function of allowing a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the write shield 16 and the first return path section 30. Another part of the magnetic flux that has been produced from the end face of the main pole 15 and has magnetized the recording medium flows back to the main pole 15 through the write shield 16 and the second return path section 40.

The write shield 16 includes the first shield 16A, the second shield 16B, and the two side shields 16C and 16D. The present embodiment thus makes it possible that, in regions on both the rear side and the front side in the direction T of travel of the recording medium relative to the end face of the main pole 15 and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, the present embodiment makes it possible to prevent adjacent track erasure induced by a skew. The first and second shields 16A and 16B contribute not only to the prevention of adjacent track erasure induced by a skew but also to an increase in the gradient of the write magnetic field. The side shields 16C and 16D greatly contribute to the prevention of adjacent track erasure, in particular. According to the present embodiment, such functions of the write shield 16 serve to increase the recording density.

Furthermore, as shown in FIG. 2, the present embodiment is configured so that in the medium facing surface 80, the distance between the first and second side parts of the main pole 15 in the track width direction TW, i.e., the width of the end face of the main pole 15, decreases with increasing distance from the first virtual plane P1. According to the present embodiment, this feature also serves to prevent adjacent track erasure induced by a skew.

The present embodiment is also configured so that in the medium facing surface 80, the distance between the first and second sidewalls of the side shields 16C and 16D in the track width direction TW decreases with increasing distance from the first virtual plane P1, as does the distance between the first and second side parts of the main pole 15. The present embodiment thus allows both the distance between the first side part and the first sidewall and the distance between the second side part and the second sidewall to be small and constant in the medium facing surface 80. This configuration allows the side shields 16C and 16D to efficiently capture the magnetic flux that is produced from the end face of the main pole 15 and spreads out to opposite areas in the track width direction TW. Consequently, according to the present embodiment, it is possible to enhance the function of the side shields 16C and 16D in particular, and to thereby enable more effective prevention of adjacent track erasure induced by a skew.

The write shield 16 cannot capture much magnetic flux if the write shield 16 is not magnetically connected with any magnetic layer having a sufficiently large volume enough to accommodate the magnetic flux captured by the write shield 16. In the present embodiment, there are provided the first return path section 30 (the magnetic layers 31, 32 and 36) which magnetically couples the second shield 16B of the write shield 16 and the main pole 15 to each other, and the second return path section 40 (the magnetic layers 41 to 44) which magnetically couples the first shield 16A of the write shield 16 and the main pole 15 to each other. Such a configuration allows the magnetic flux captured by the write shield 16 to flow into the main pole 15 by way of the first and second return path sections 30 and 40. In the present embodiment, the first and second return path sections 30 and 40 and the main pole 15, which are magnetic layers large in volume, are magnetically connected to the write shield 16. This allows the write shield 16 to capture much magnetic flux, so that the above-described effect of the write shield 16 can be exerted effectively.

If the first return path section has an end face that is exposed over a large area in the medium facing surface 80, part of the magnetic flux that has been captured from the end face of the write shield 16 into the write shield 16 and has reached the first return path section may leak from the end face of the first return path section toward the recording medium. This may result in the occurrence of adjacent track erasure. Furthermore, heat generated by the first portion 10 of the coil may cause expansion of part of the first return path section and thereby cause the end face of the first return path section which constitutes part of the medium facing surface 80 to protrude toward the recording medium. As a result, the end face of the main pole 15 and an end of the read head section 8 located in the medium facing surface 80 may get farther from the recording medium. This may result in degradation of the read and write characteristics.

In contrast to this, in the present embodiment, the first return path section 30 does not have an end face that is exposed over a large area in the medium facing surface 80. More specifically, in the present embodiment, the magnetic layers 31 and 32 constituting part of the first return path section 30 are accommodated in the accommodation part 50. The accommodation part 50 includes the interposer 50A interposed between the first return path section 30 and the medium facing surface 80. The interposer 50A has the inclined surface 50Aa facing toward the first return path section 30, and the magnetic layer 31 constituting part of the first return path section 30 includes the second portion 31B extending along the inclined surface 50Aa. These features of the present embodiment make it possible to connect the first return path section 30 to the write shield 16 without causing the end face of the first return path section 30 to be exposed over a large area in the medium facing surface 80. Consequently, according to the present embodiment, it is possible to avoid the above-described problems resulting from the configuration in which the end face of the first return path section is exposed over a large area in the medium facing surface 80. More specifically, the present embodiment makes it possible to suppress the leakage of magnetic flux from the first return path section 30 toward the recording medium and suppress the protrusion of part of the medium facing surface 80 in the vicinity of the second portion 31B.

In the present embodiment, the interposer 50A, which is composed of part of the nonmagnetic layer 51 and part of the nonmagnetic film 52, is made of an inorganic insulating material harder than the material of the second portion 31B, in particular. The interposer 50A therefore has the function of suppressing a change in the position of the surface of the second portion 31B facing toward the interposer 50A. Consequently, according to the present embodiment, it is possible to more effectively suppress the protrusion of part of the medium facing surface 80 in the vicinity of the second portion 31B.

Figure 7A:
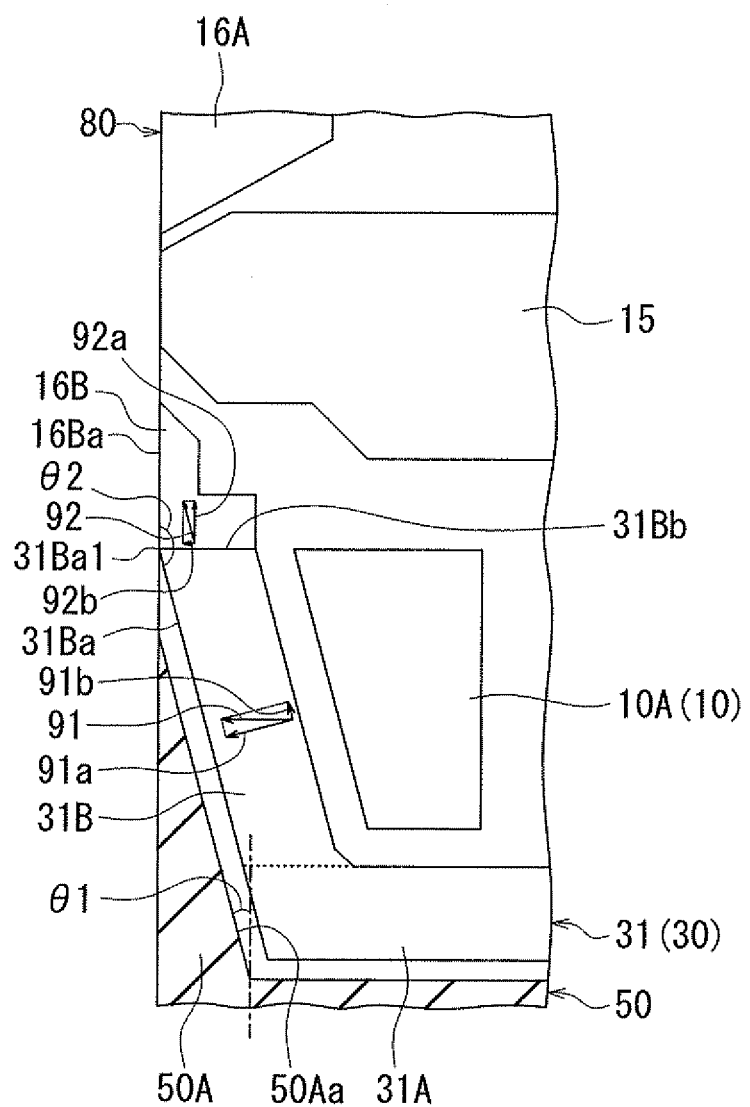
FIG. 7A and FIG. 7B are explanatory diagrams illustrating the function of the interposer of the accommodation part of the first embodiment of the invention.
Figure 7B:
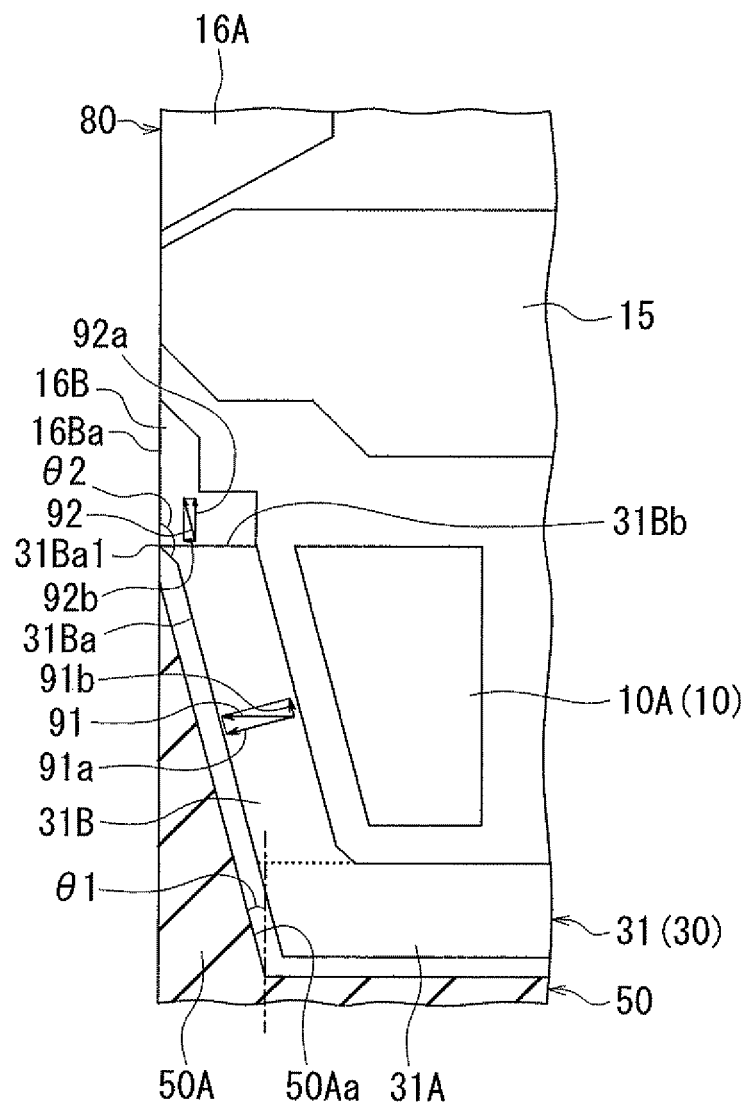

Reference is now made to FIG. 7A and FIG. 7B to describe the effects resulting from the configuration in which the interposer 50A of the accommodation part 50 has the inclined surface 50Aa. FIG. 7A and FIG. 7B are explanatory diagrams illustrating the function of the interposer 50A of the accommodation part 50. The difference between FIG. 7A and FIG. 7B will be described later. In FIG. 7A and FIG. 7B, the direction perpendicular to the top surface 1a of the substrate 1 is indicated by a dot-and-dash line, and a first angle formed by the inclined surface 50Aa relative to the direction perpendicular to the top surface 1a of the substrate 1 is represented by the symbol $\theta 1$. When heat is generated by the first portion 10 of the coil, the first portion 10 and components therearound are heated and thereby expanded. This causes an external force to be applied to the second portion 31B in the direction from the first portion 10 to the medium facing surface 80. In FIG. 7A and FIG. 7B, the arrow with reference numeral 91 indicates the aforementioned external force applied to the second portion 31B. This external force 91 can be decomposed into a component 91a perpendicular to the inclined surface 50Aa and a component 91b in the direction parallel to the inclined surface 50Aa and toward the second shield 16B. As previously mentioned, the interposer 50A has the function of suppressing a change in the position of the surface of the second portion 31B facing toward the interposer 50A. Therefore, the aforementioned component 91b deforms the second portion 31B such that the second end face 31Bb shifts in the direction of the component 91b.

The heat generated by the first portion 10 of the coil also heats and expands the second portion 31B. This also deforms the second portion 31B such that the second end face 31Bb shifts in the direction of the component 91b.

Consequently, an external force 92 is applied to the second shield 16B from the second end face 31Bb in a direction the same as the direction of the aforementioned component 91b. This external force 92 can be decomposed into a component 92a perpendicular to the second end face 31Bb and a component 92b in the direction parallel to the second end face 31Bb and toward the medium facing surface 80. The aforementioned component 92b deforms the second shield 16B such that the second end face portion 16Ba protrudes toward the recording medium. Such a deformation of the second shield 16B causes the main pole 15 located near the second shield 16B to be also deformed such that its end face protrudes toward the recording medium. According to the present embodiment, it is thus possible to bring the end face of the main pole 15 near the recording medium while suppressing the protrusion of part of the medium facing surface 80 in the vicinity of the second portion 31B. This allows the improvement of write characteristics. The first angle $\theta 1$ is preferably in the range of 5° to 45°, and more preferably in the range of 8° to 16°.

If the inclined surface 50Aa is replaced with a wall face parallel to the medium facing surface 80 and the second portion 31B is replaced with a portion of the magnetic layer 31 extending in the direction perpendicular to the top surface 1a of the substrate 1, the aforementioned component 92b will not occur on the second shield 16B and therefore it is not possible to bring the end face of the main pole 15 near the recording medium in the above-described manner.

In the present embodiment, as shown in FIG. 7A and FIG. 7B, the first end face 31Ba of the second portion 31B has an end 31Ba1 located in the medium facing surface 80. When seen at this end 31Ba1, the first end face 31Ba forms a second angle $\theta 2$ greater than 90° relative to a part of the medium facing surface 80, the part of the medium facing surface 80 being located on the front side in the direction of travel of the recording medium relative to the end 31Ba1. The second angle $\theta 2$ may be equal to 180° minus the first angle $\theta 1$, or may be smaller than 180° minus the first angle $\theta 1$.

FIG. 7A shows the case where the second angle $\theta 2$ is equal to 180° minus the first angle $\theta 1$. In FIG. 7A, the angle formed by the first end face 31Ba relative to the direction perpendicular to the top surface 1a of the substrate 1 is equal to the first angle $\theta 1$ regardless of position on the first end face 31Ba. When the second angle $\theta 2$ is equal to 180° minus the first angle $\theta 1$, the second angle $\theta 2$ preferably falls within the range of 135° to 175°, and more preferably within the range of 164° to 172°.

FIG. 7B shows the case where the second angle $\theta 2$ is smaller than 180° minus the first angle $\theta 1$. In FIG. 7B, a portion of the first end face 31Ba located in the vicinity of the end 31Ba1 forms an angle greater than the first angle $\theta 1$ relative to the direction perpendicular to the top surface 1a of the substrate 1. The remaining portion of the first end face 31Ba forms an angle equal to the first angle $\theta 1$ relative to the direction perpendicular to the top surface 1a of the substrate 1. When the second angle $\theta 2$ is smaller than 180° minus the first angle $\theta 1$, the second angle $\theta 2$ preferably falls within the range of 120° to 175°, and more preferably within the range of 135° to 172°.

A description will now be given of the effect provided by the feature that the second angle $\theta 2$ is greater than 90°. If the magnetic path formed by the write shield 16 and the first return path section 30 has an edge with an angle of 90° or less in the vicinity of the medium facing surface 80, there tends to be magnetic field leakage from the vicinity of this edge to the outside of the magnetic path. As a result, adjacent track erasure may occur. In contrast to this, in the present embodiment, since the second angle $\theta 2$ is greater than 90°, the magnetic path formed by the write shield 16 and the first return path section 30 does not have an edge with an angle of 90° or less in the vicinity of the medium facing surface 80. According to the present embodiment, it is thus possible to prevent the occurrence of adjacent track erasure induced by an edge with an angle of 90° or less.

The features of the shape of the main pole 15 and the effects resulting therefrom will now be described. In the present embodiment, the top surface 15T of the main pole 15 includes the first portion 15T1 inclined relative to the first and second virtual planes P1 and P2 and the medium facing surface 80, while the bottom end 15L of the main pole 15 includes the first and third portions 15L1 and 15L3 inclined relative to the first and second virtual planes P1 and P2 and the medium facing surface 80. This allows the main pole 15 to have a small thickness in the medium facing surface 80, thereby allowing the prevention of adjacent track erasure induced by a skew. On the other hand, since a portion of the main pole 15 away from the medium facing surface 80 can have a large thickness, it is possible for the main pole 15 to direct much magnetic flux to the medium facing surface 80, and this allows the improvement of write characteristics such as the overwrite property.

Furthermore, in the present embodiment, the bottom end 15L of the main pole 15 includes the second portion 15L2. This allows the distance between the third portion 15L3 and the second shield 16B to be greater than that in the case without the second portion 15L2. The present embodiment thus makes it possible to prevent degradation in the write characteristics induced by magnetic flux leakage from the main pole 15 to the write shield 16.

According to the present embodiment, the above-described features of the shape of the main pole 15 make it possible to prevent the skew-induced problems and provide improved write characteristics.

A method of manufacturing the magnetic head according to the present embodiment will now be described with reference to FIG. 8A through FIG. 24B. FIG. 8A through FIG. 24B each show a stack of layers formed in the process of manufacturing the magnetic head. FIG. 8A to FIG. 24A each show a cross section perpendicular to the medium facing surface 80 and to the top surface 1a of the substrate 1, or the main cross section, in particular. FIG. 8B to FIG. 16B each show a cross section parallel to the position at which the medium facing surface 80 is to be formed. In FIG. 8A to FIG. 16A, lines nB-nB (n is any integer between 8 and 16 inclusive) indicate the positions of the cross sections shown in FIG. 8B to FIG. 16B. FIG. 17B to FIG. 24B each show a cross section taken at the position at which the medium facing surface 80 is to be formed. The symbol "ABS" in FIG. 8A to FIG. 24A indicates the position at which the medium facing surface 80 is to be formed.

Figure 8A:
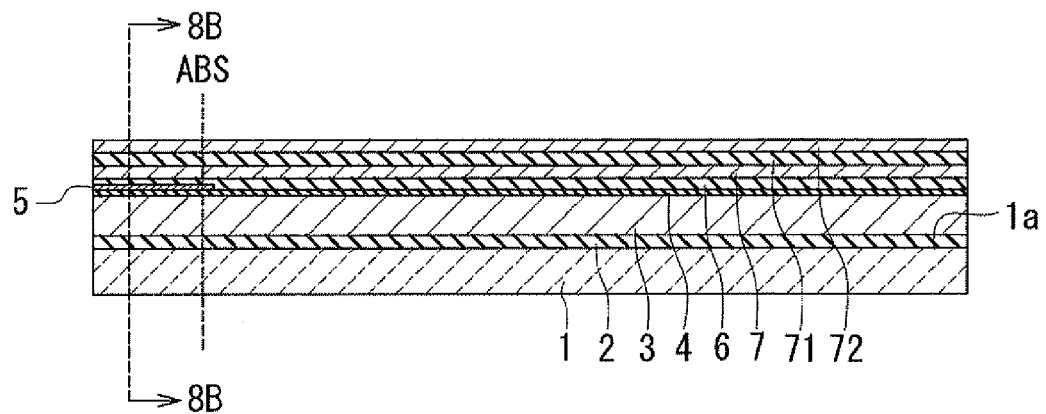
FIG. 8A and FIG. 8B are cross-sectional views showing a step of a method of manufacturing the magnetic head according to the first embodiment of the invention.
Figure 8B:
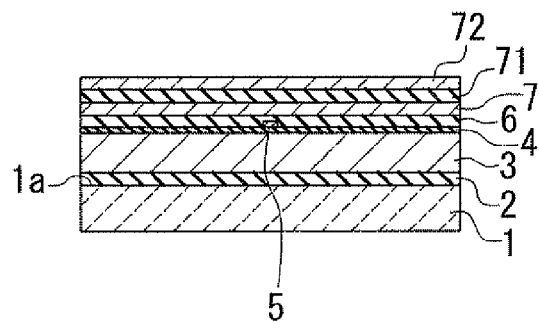

In the method of manufacturing the magnetic head according to the present embodiment, first, as shown in FIG. 8A and FIG. 8B, the insulating layer 2, the first read shield layer 3 and the first read shield gap film 4 are formed in this order on the substrate 1. Next, the MR element 5 and not-shown leads connected to the MR element 5 are formed on the first read shield gap film 4. The MR element 5 and the leads are then covered with the second read shield gap film 6. Then, the second read shield layer 7, the nonmagnetic layer 71 and the middle shield layer 72 are formed in this order on the second read shield gap film 6.

Figure 9A:
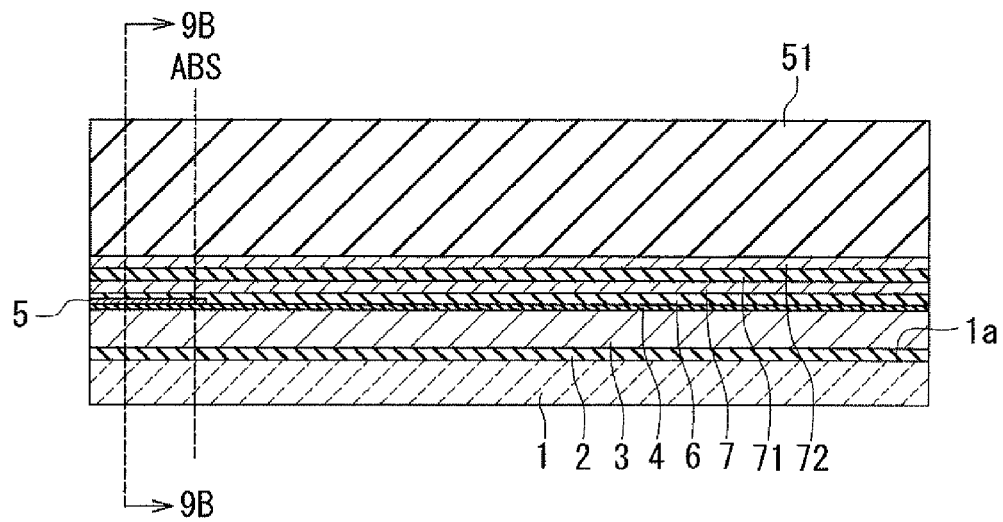
FIG. 9A and FIG. 9B are cross-sectional views showing a step that follows the step shown in FIG. 8A and FIG. 8B.
Figure 9B:
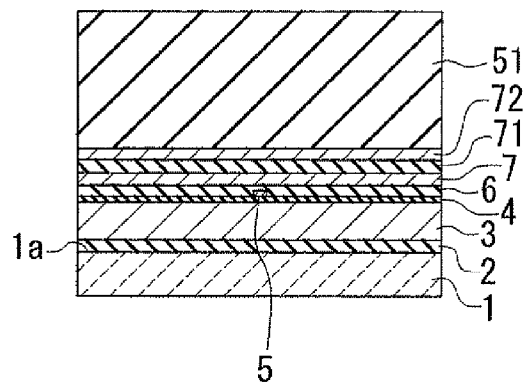

FIG. 9A and FIG. 9B show the next step. In this step, the nonmagnetic layer 51 is formed over the entire top surface of the stack. The nonmagnetic layer 51 has a thickness in the range of 1.0 to 1.6 μm, for example.

Figure 10A:
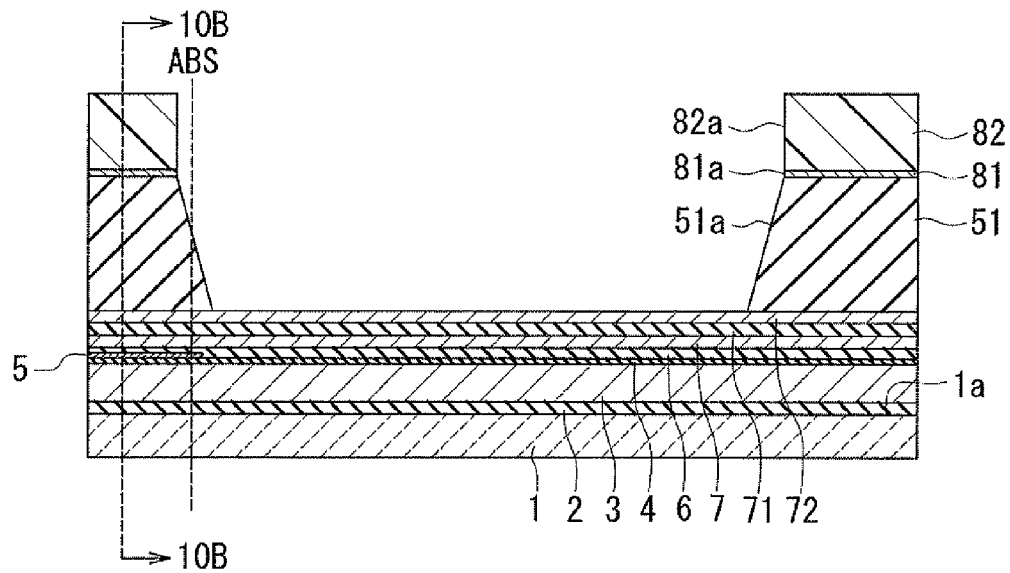
FIG. 10A and FIG. 10B are cross-sectional views showing a step that follows the step shown in FIG. 9A and FIG. 9B.
Figure 10B:
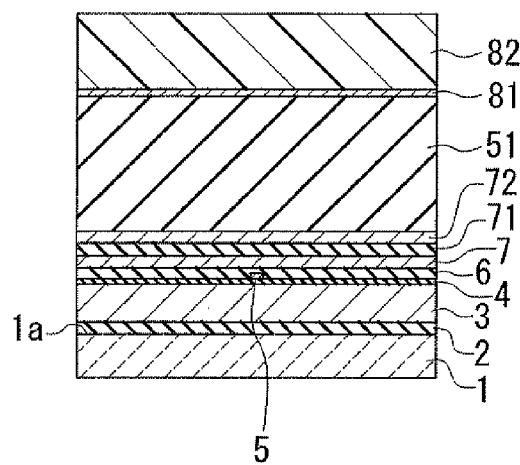

FIG. 10A and FIG. 10B show the next step. In this step, first, an etching mask material layer made of, for example, Ru, is formed on the top surface of the nonmagnetic layer 51. The etching mask material layer has a thickness in the range of 50 to 60 nm, for example. Next, a photoresist mask 82 having an opening 82*a* is formed on the etching mask material layer. The opening 82*a* is shaped to correspond to the planar shape of the opening 51*a* which is to be formed later in the nonmagnetic layer 51. The photoresist mask 82 is formed by patterning a photoresist layer. Note that any photoresist mask to be employed in any subsequent step is formed in the same manner as the photoresist mask 82. Then, a portion of the etching mask material layer exposed from the opening 82*a* of the photoresist mask 82 is removed by, for example, ion beam etching (hereinafter referred to as IBE) using the photoresist mask 82 as the etching mask. This makes the etching mask material layer into an etching mask 81. The etching mask 81 has an opening 81*a* shaped to correspond to the planar shape of the opening 51*a* to be formed later in the nonmagnetic layer 51.

Then, using the etching mask 81 and the photoresist mask 82 as an etching mask, the nonmagnetic layer 51 is taper-etched by, for example, reactive ion etching (hereinafter referred to as RIE) to form the opening 51*a* in the nonmagnetic layer 51. The middle shield layer 72 functions as an etching stopper for stopping the etching when the nonmagnetic layer 51 is etched by RIE. The etching mask 81 and the photoresist mask 82 are then removed.

Where the nonmagnetic layer 51 is formed of alumina, an etching gas containing $BCl_3$ and $N_2$, for example, is used for RIE to taper-etch the nonmagnetic layer 51 in the aforementioned etching step. $BCl_3$ is a main component contributing to the etching of the nonmagnetic layer 51. $N_2$ is a gas for forming, during the etching of the nonmagnetic layer 51, a sidewall-protecting film on the sidewall of the groove formed by the etching. The etching gas containing $N_2$ serves to form the sidewall-protecting film on the sidewall of the groove during the etching of the nonmagnetic layer 51, thereby serving to make the first and second wall faces of the opening 51*a* inclined relative to the direction perpendicular to the top surface 1*a* of the substrate 1. The first and second wall faces of the opening 51*a* form an angle in the range of, for example, 5° to 45° relative to the direction perpendicular to the top surface 1*a* of the substrate 1.

Figure 11A:
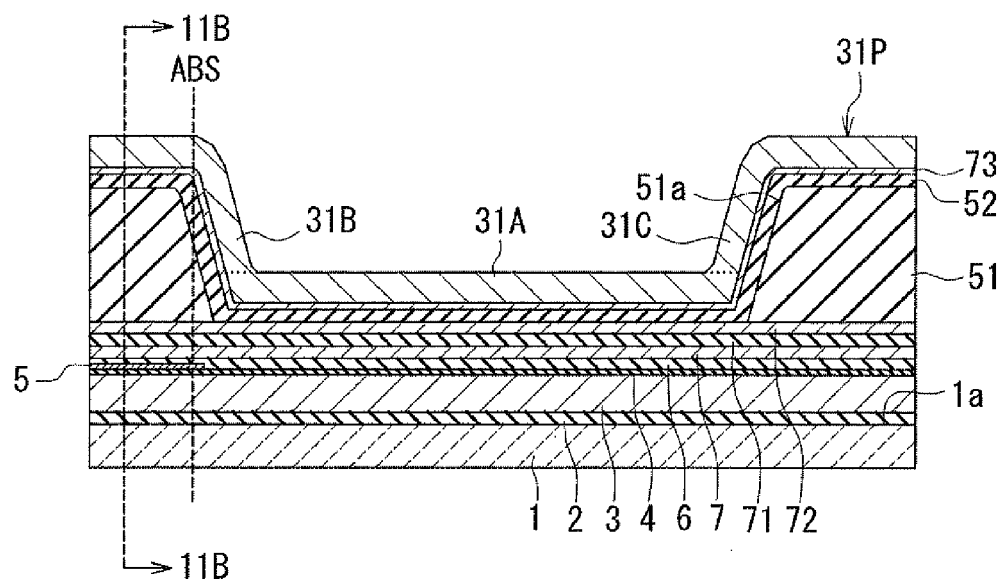
FIG. 11A and FIG. 11B are cross-sectional views showing a step that follows the step shown in FIG. 10A and FIG. 10B.
Figure 11B:
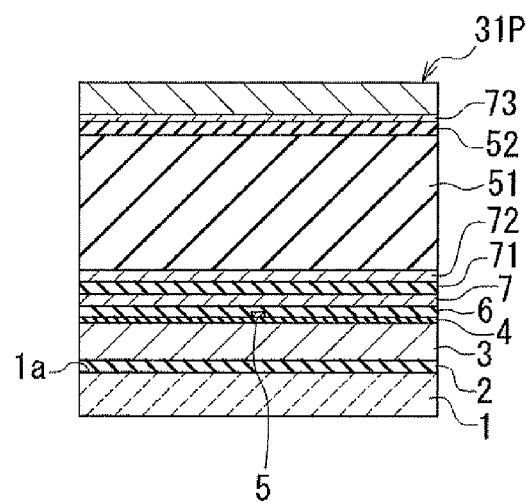

FIG. 11A and FIG. 11B show the next step. In this step, first, the nonmagnetic film 52 is formed over the entire top surface of the stack. Where alumina is selected as the material of the nonmagnetic film 52, the nonmagnetic film 52 is formed by atomic layer deposition (hereinafter referred to as ALD), for example. The nonmagnetic film 52 has a thickness in the range of 0.1 to 0.2 μm, for example. Next, the electrode film 73 is formed over the entire top surface of the stack by sputtering or ion beam deposition, for example. Then, a preliminary magnetic layer 31P, which is to later become the magnetic layer 31, is formed by frame plating using the electrode film 73 as an electrode and seed layer. The preliminary magnetic layer 31P has a thickness in the range of 0.4 to 0.6 μm, for example. Part of the preliminary magnetic layer 31P is located above the top surface of the nonmagnetic layer 51.

The preliminary magnetic layer 31P includes the first to third portions 31A, 31B and 31C. The first to third portions 31A, 31B and 31C are thus formed from the same material simultaneously in the step of forming the preliminary magnetic layer 31P.

Figure 12A:
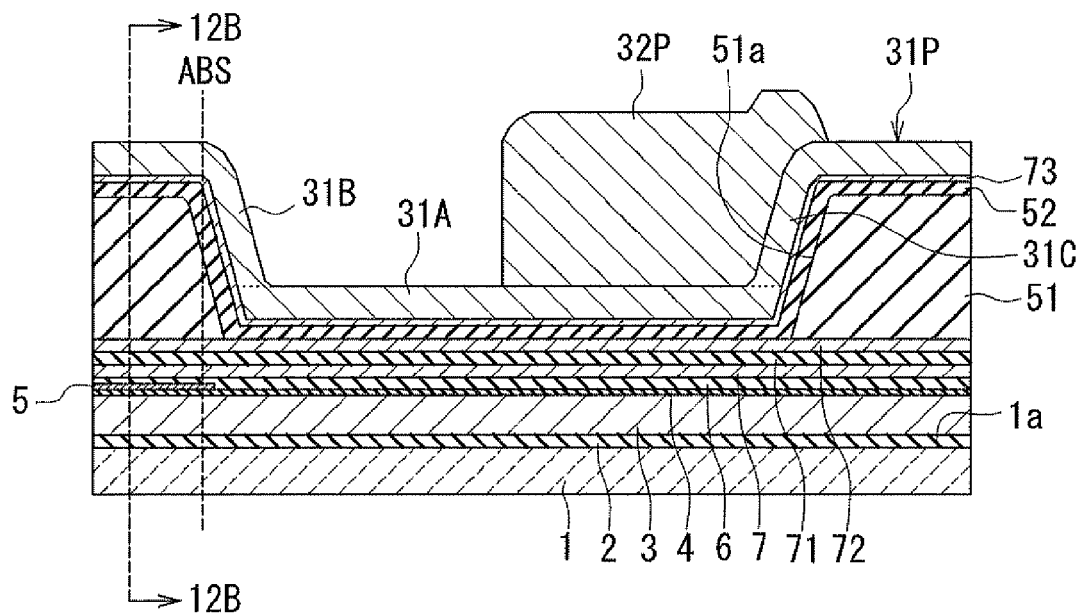
FIG. 12A and FIG. 12B are cross-sectional views showing a step that follows the step shown in FIG. 11A and FIG. 11B.
Figure 12B:
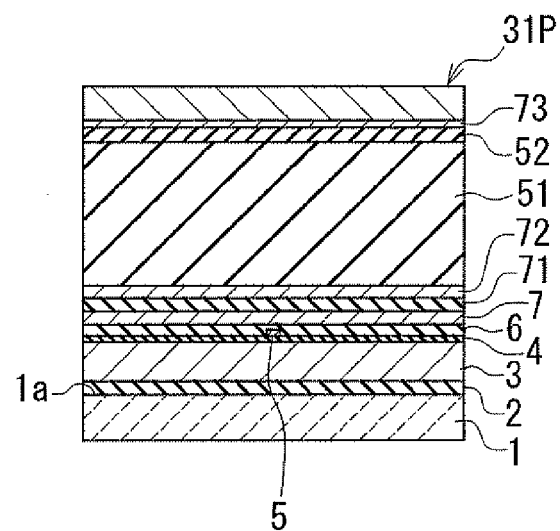

FIG. 12A and FIG. 12B show the next step. In this step, a preliminary magnetic layer 32P, which is to later become the magnetic layer 32, is formed on the preliminary magnetic layer 31P by frame plating using the electrode film 73 as an electrode and seed layer. The preliminary magnetic layer 32P is formed such that its top surface is higher in level than the part of the preliminary magnetic layer 31P located above the top surface of the nonmagnetic layer 51.

Figure 13A:
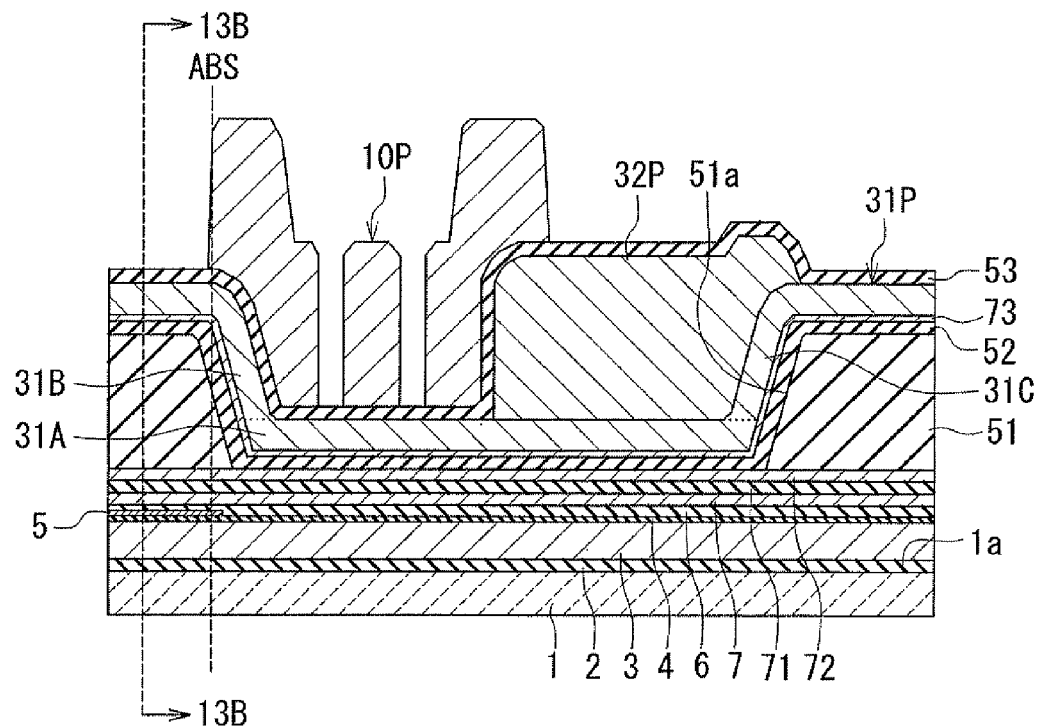
FIG. 13A and FIG. 13B are cross-sectional views showing a step that follows the step shown in FIG. 12A and FIG. 12B.
Figure 13B:
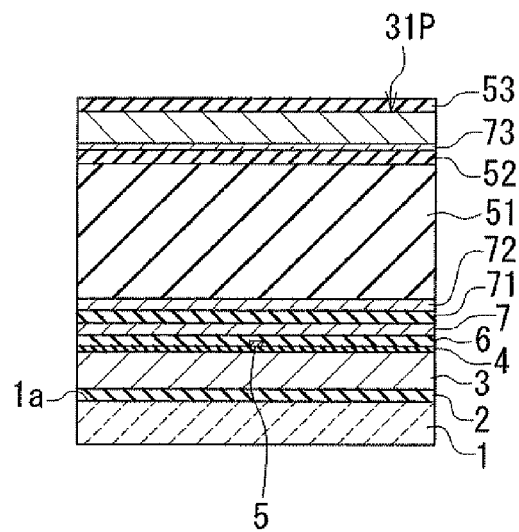

FIG. 13A and FIG. 13B show the next step. In this step, first, the insulating film 53 is formed over the entire top surface of the stack. Where alumina is selected as the material of the insulating film 53, the insulating film 53 is formed by ALD, for example. The insulating film 53 has a thickness in the range of 0.1 to 0.2 μm, for example.

Next, a conductive layer 10P is formed. The conductive layer 10P is to later become the first portion 10 of the coil. The conductive layer 10P is formed in the following manner, for example. First, a seed layer to become a part of the conductive layer 10P is formed. Then, a plating film to become another part of the conductive layer 10P is formed on the seed layer by frame plating, for example. The plating film has a planar spiral shape like that of the first portion 10. The outermost turn of the plating film is formed such that a part thereof lies over a part of the insulating film 53 that is located above the top surface of the nonmagnetic layer 51. The innermost turn of the plating film is formed such that a part thereof lies over a part of the insulating film 53 that is located above the top surface of the preliminary magnetic layer 32P. Then, part of the seed layer other than the part lying under the plating film is removed by, for example, IBE, using the plating film as the etching mask.

Figure 14A:
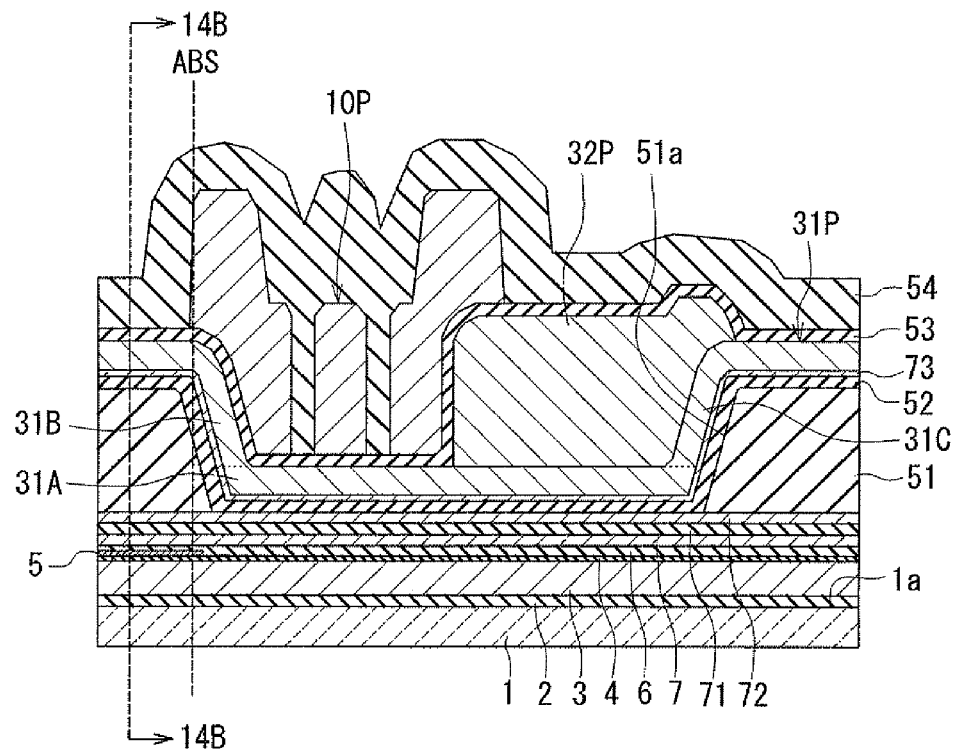
FIG. 14A and FIG. 14B are cross-sectional views showing a step that follows the step shown in FIG. 13A and FIG. 13B.
Figure 14B:
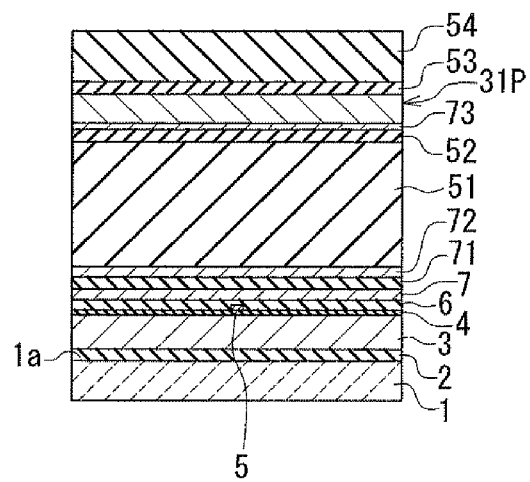

FIG. 14A and FIG. 14B show the next step. In this step, the insulating layer 54 is formed to fill the space between adjacent turns of the conductive layer 10P and cover the conductive layer 10P. Where alumina is selected as the material of the insulating layer 54, the insulating layer 54 is formed by ALD, for example. The insulating layer 54 has a thickness in the range of 0.3 to 0.5 μm, for example.

Figure 15A:
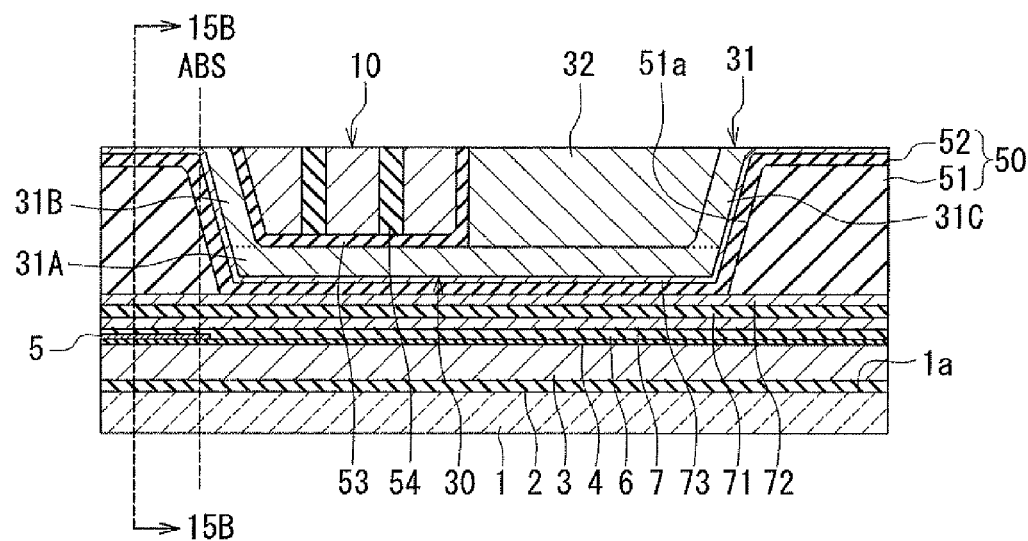
FIG. 15A and FIG. 15B are cross-sectional views showing a step that follows the step shown in FIG. 14A and FIG. 14B.
Figure 15B:
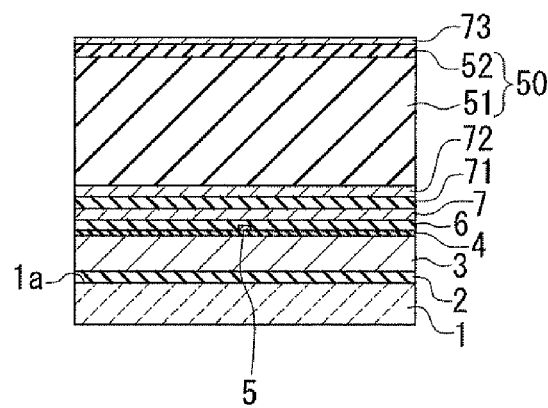

FIG. 15A and FIG. 15B show the next step. In this step, the conductive layer 10P, the preliminary magnetic layers 31P and 32P, the insulating film 53 and the insulating layer 54 are polished by, for example, chemical mechanical polishing (hereinafter referred to as CMP), until the electrode film 73 is exposed. In this polishing process, the electrode film 73 functions as a polishing stopper for stopping the polishing. As a result of this polishing process, the conductive layer 10P becomes the first portion 10 and the preliminary magnetic layers 31P and 32P become the magnetic layers 31 and 32, respectively.

Figure 16A:
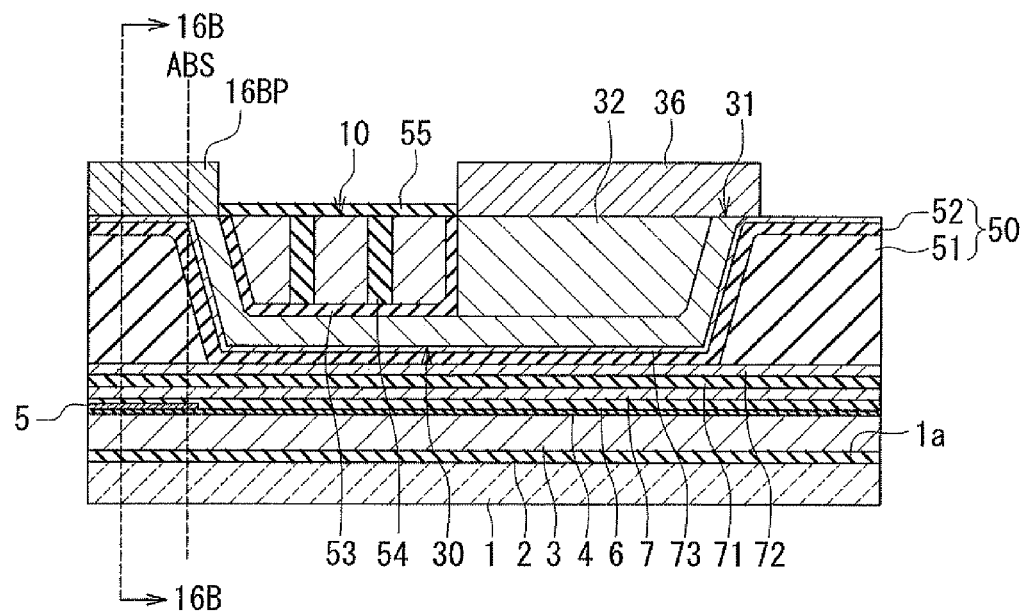
FIG. 16A and FIG. 16B are cross-sectional views showing a step that follows the step shown in FIG. 15A and FIG. 15B.
Figure 16B:
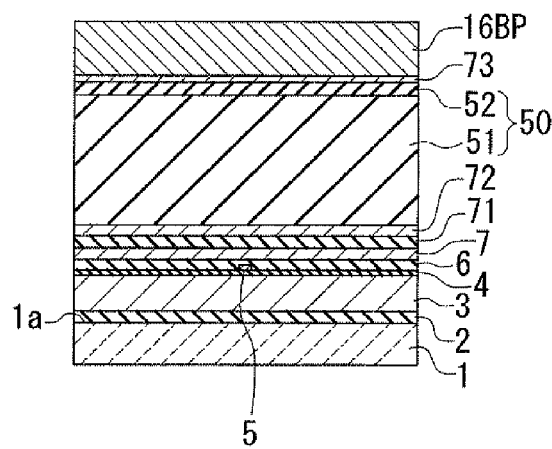

FIG. 16A and FIG. 16B show the next step. In this step, first, the insulating layer 55 is formed over the first portion 10, the insulating film 53 and the insulating layer 54. Then, a magnetic layer 16BP, which is to later become the second shield 16B, is formed over the second portion 31B of the magnetic layer 31 and the electrode film 73, and the magnetic layer 36 is formed over the third portion 31C of the magnetic layer 31 and the magnetic layer 32, by employing, for example, frame plating with the electrode film 73 used as an electrode.

Figure 17A:
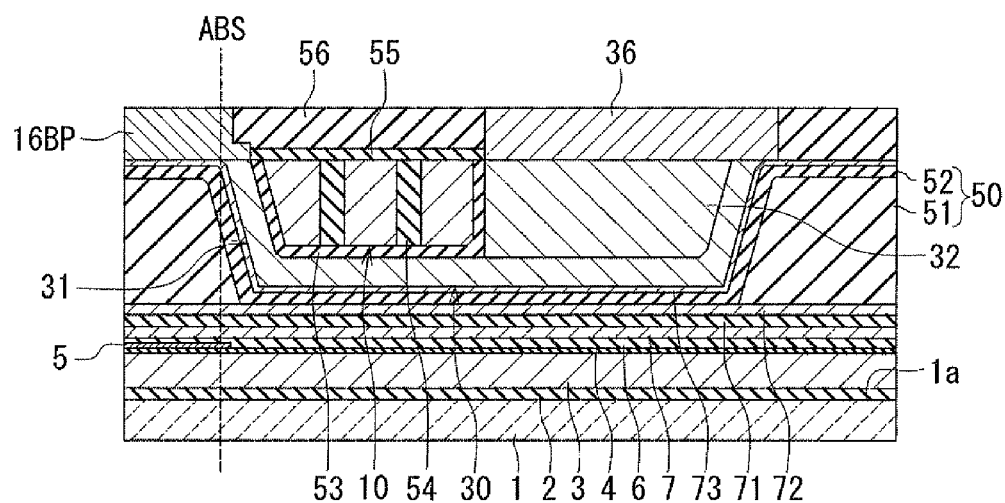
FIG. 17A and FIG. 17B are cross-sectional views showing a step that follows the step shown in FIG. 16A and FIG. 16B.
Figure 17B:
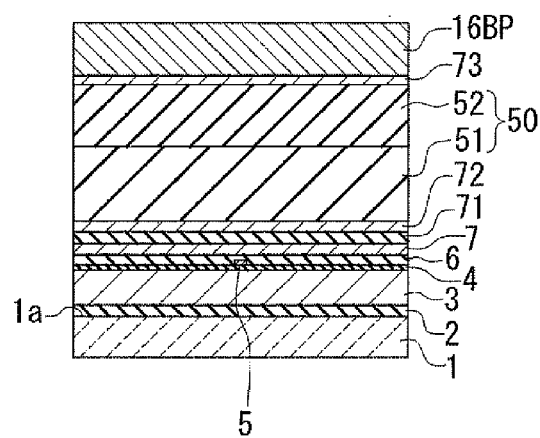

FIG. 17A and FIG. 17B show the next step. In this step, first, part of the magnetic layer 16BP is etched by, for example, IBE. This etching is performed to determine the length of the second inclined surface 16Bb of the second shield 16B, which is to be formed later, in the direction perpendicular to the medium facing surface 80. Next, the nonmagnetic layer 56 is formed over the entire top surface of the stack. The nonmagnetic layer 56 is then polished by, for example, CMP, until the magnetic layers 16BP and 36 are exposed.

Figure 18A:
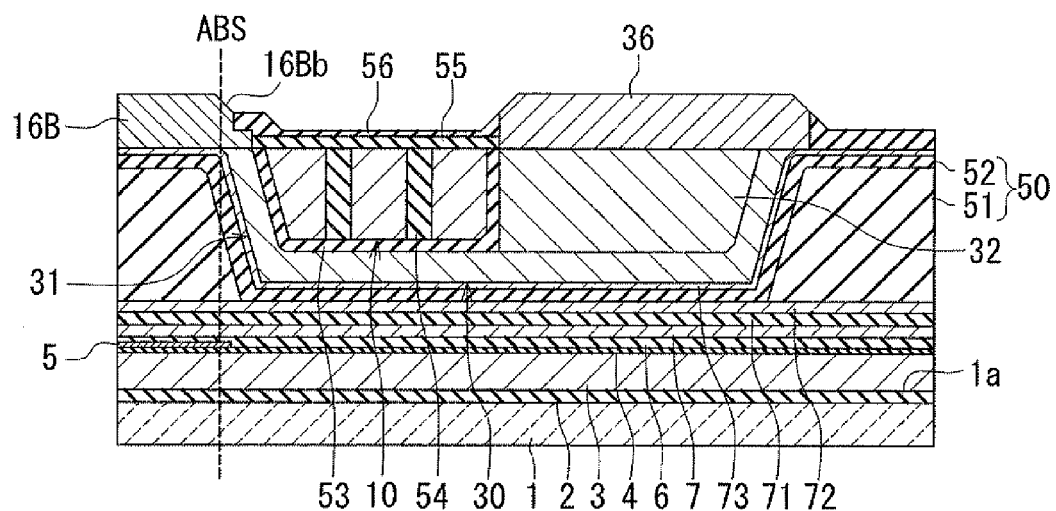
FIG. 18A and FIG. 18B are cross-sectional views showing a step that follows the step shown in FIG. 17A and FIG. 17B.
Figure 18B:
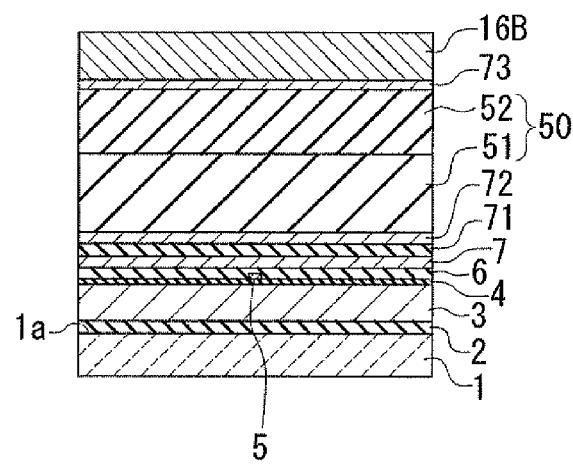

FIG. 18A and FIG. 18B show the next step. In this step, first, part of the magnetic layer 16BP and part of the magnetic layer 36 are etched by, for example, IBE, so as to provide the magnetic layer 16BP with the second inclined surface 16Bb and to chamfer corners at the edge of the top surface of the magnetic layer 36. This makes the magnetic layer 16BP into the second shield 16B. Next, a not-shown photoresist mask is formed to cover the second shield 16B and the magnetic layer 36. Using this photoresist mask as an etching mask, the nonmagnetic layer 56 is then taper-etched by, for example, RIE. Where the nonmagnetic layer 56 is made of alumina, the etching conditions for the nonmagnetic layer 56 may be the same as those for the nonmagnetic layer 51. The photoresist mask is then removed. The step shown in FIG. 18A and FIG. 18B determines the shape of the bottom end 15L of the main pole 15.

Figure 19A:
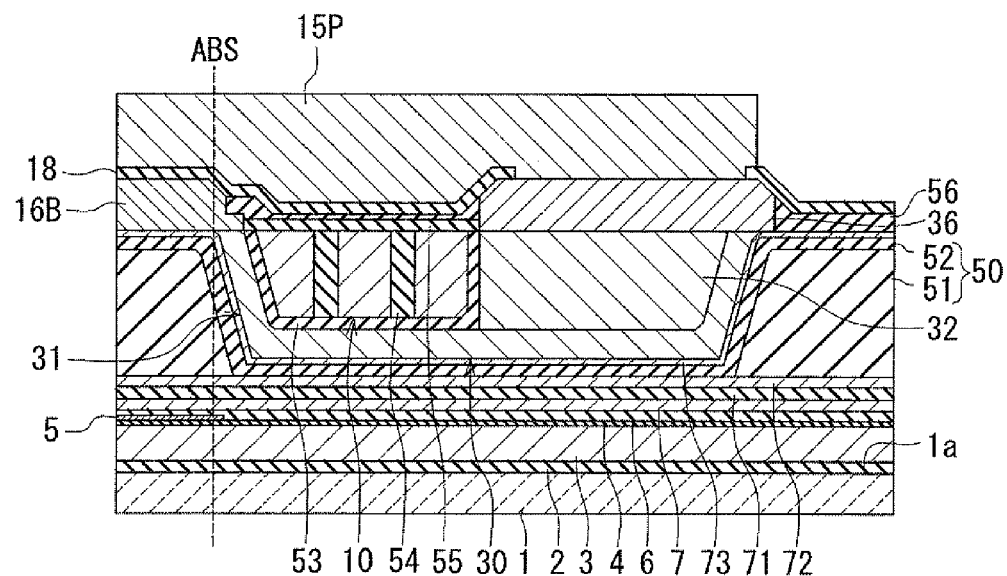
FIG. 19A and FIG. 19B are cross-sectional views showing a step that follows the step shown in FIG. 18A and FIG. 18B.
Figure 19B:
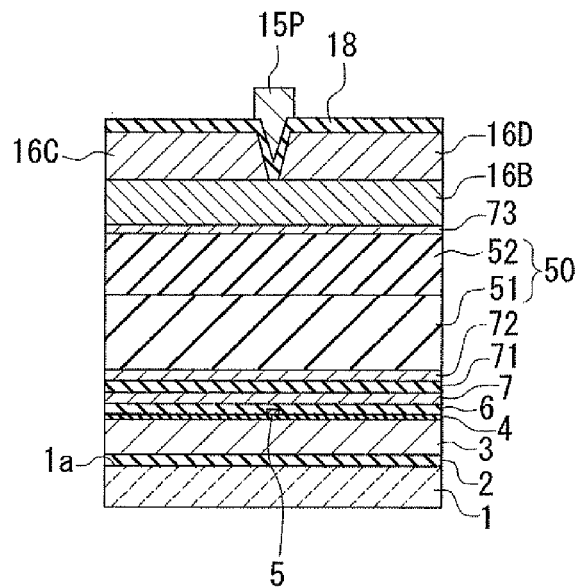

FIG. 19A and FIG. 19B show the next step. In this step, first, the side shields 16C and 16D are formed on the second shield 16B by, for example, frame plating using the electrode film 73 as an electrode. Next, the second gap layer 18 is formed to cover the second shield 16B and the side shields 16C and 16D. Where alumina is selected as the material of the second gap layer 18, the second gap layer 18 is formed by ALD, for example. Where Ru is selected as the material of the second gap layer 18, the second gap layer 18 is formed by chemical vapor deposition, for example. Next, the second gap layer 18 is selectively etched to form therein an opening for exposing the top surface of the magnetic layer 36 and an opening for exposing the coil connection part 10E (see FIG. 3) of the first portion 10 of the coil. Next, a magnetic layer 15P, which is to later become the main pole 15, and a not-shown connection layer are formed by frame plating, for example. The magnetic layer 15P and the connection layer are formed such that their top surfaces are higher in level than the portions of the second gap layer 18 lying on the side shields 16C and 16D.

Figure 20A:
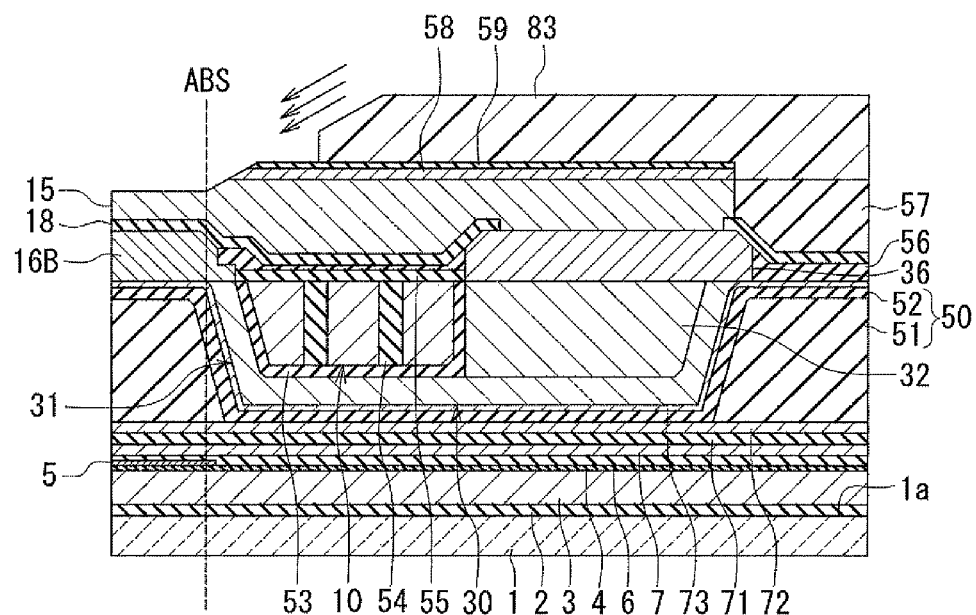
FIG. 20A and FIG. 20B are cross-sectional views showing a step that follows the step shown in FIG. 19A and FIG. 19B.
Figure 20B:
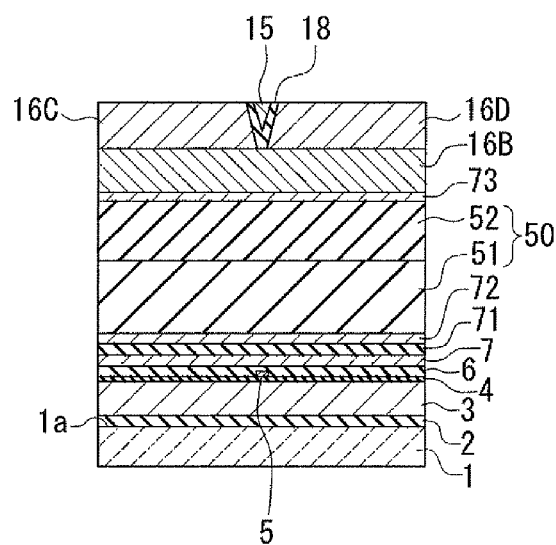

FIG. 20A and FIG. 20B show the next step. In this step, first, the nonmagnetic layer 57 is formed over the entire top surface of the stack. The nonmagnetic layer 57 is then polished by, for example, CMP, until the magnetic layer 15P and the connection layer are exposed. Next, the nonmagnetic metal layer 58 and the insulating layer 59 are formed on the magnetic layer 15P. A photoresist mask 83 is then formed over the nonmagnetic layer 57, the nonmagnetic metal layer 58 and the insulating layer 59. Portions of the magnetic layer 15P, the side shields 16C and 16D and the second gap layer 18 are then etched by, for example, IBE, using the nonmagnetic metal layer 58, the insulating layer 59 and the photoresist mask 83 as an etching mask. This makes the magnetic layer 15P into the main pole 15. The photoresist mask 83 is then removed.

Where IBE is employed to etch the portions of the magnetic layer 15P, the side shields 16C and 16D and the second gap layer 18, the etching is performed such that ion beams travel in a direction at an angle of 40° to 75° relative to the direction perpendicular to the top surface 1a of the substrate 1 and that the direction of travel of the ion beams is caused to rotate as viewed in the direction perpendicular to the top surface 1a of the substrate 1. The arrows in FIG. 20A indicate the direction of travel of the ion beams. Performing IBE in such a manner provides the magnetic layer 15P with a top surface having the first portion 15T1 and the second portion 15T2.

Figure 21A:
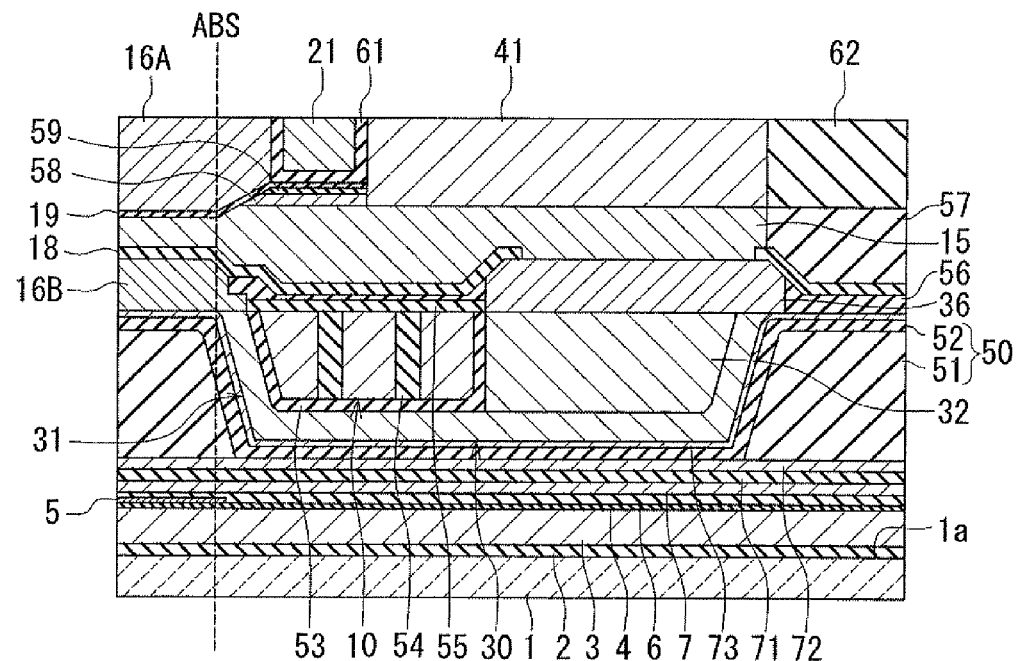
FIG. 21A and FIG. 21B are cross-sectional views showing a step that follows the step shown in FIG. 20A and FIG. 20B.
Figure 21B:
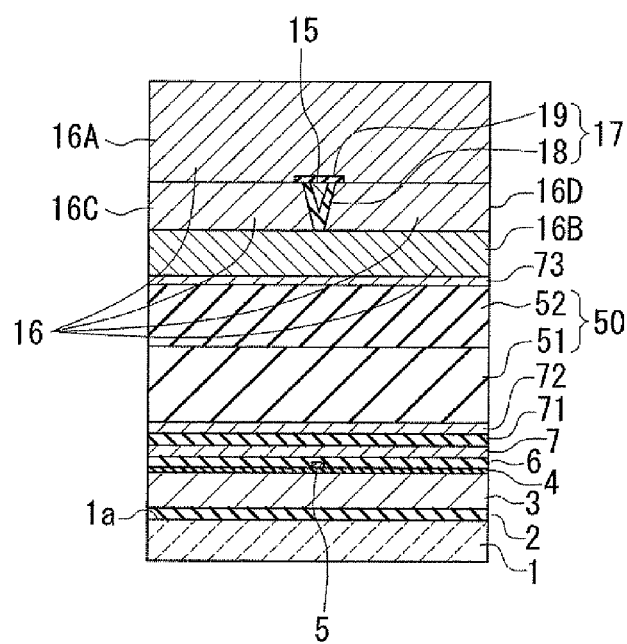

FIG. 21A and FIG. 21B show the next step. In this step, first, the first gap layer 19 is formed over the entire top surface of the stack by sputtering or chemical vapor deposition, for example. The first gap layer 19, the nonmagnetic metal layer 58, and the insulating layer 59 are then selectively etched by, for example, IBE, so that part of the top surface 15T of the main pole 15, part of each of the top surfaces of the side shields 16C and 16D, and the top surface of the connection layer are exposed. Frame plating, for example, is then performed to form the first shield 16A over the side shields 16C and 16D and the first gap layer 19 and form the magnetic layer 41 on the main pole 15.

Next, the insulating film 61 is formed over the entire top surface of the stack. The insulating film 61 is then selectively etched by, for example, IBE, so that the top surface of the connection layer is exposed. The first layer 21 of the second portion 20 of the coil is then formed by frame plating, for example. The first layer 21 is formed such that its top surface is higher in level than portions of the insulating film 61 lying on the first shield 16A and the magnetic layer 41. Next, the nonmagnetic layer 62 is formed over the entire top surface of the stack. The first layer 21, the insulating film 61 and the nonmagnetic layer 62 are then polished by, for example, CMP, until the first shield 16A and the magnetic layer 41 are exposed.

Figure 22A:
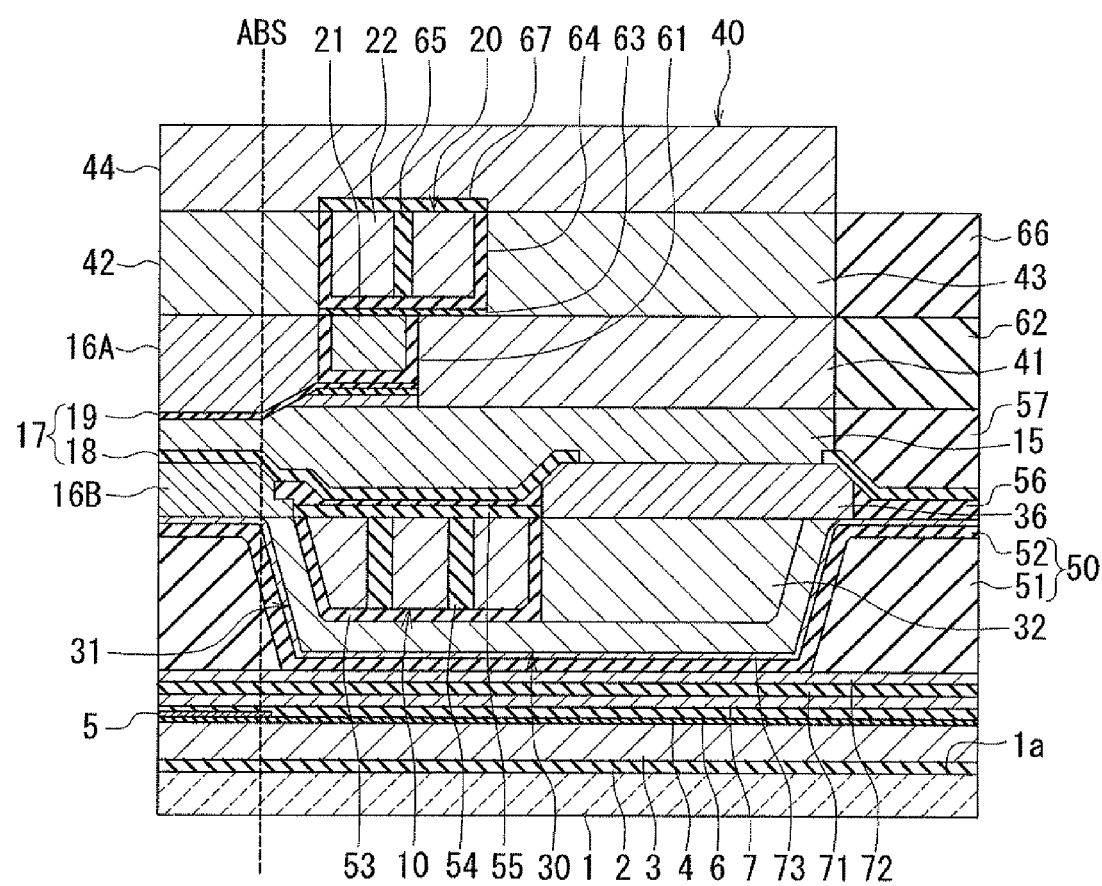
FIG. 22A and FIG. 22B are cross-sectional views showing a step that follows the step shown in FIG. 21A and FIG. 21B.
Figure 22B:
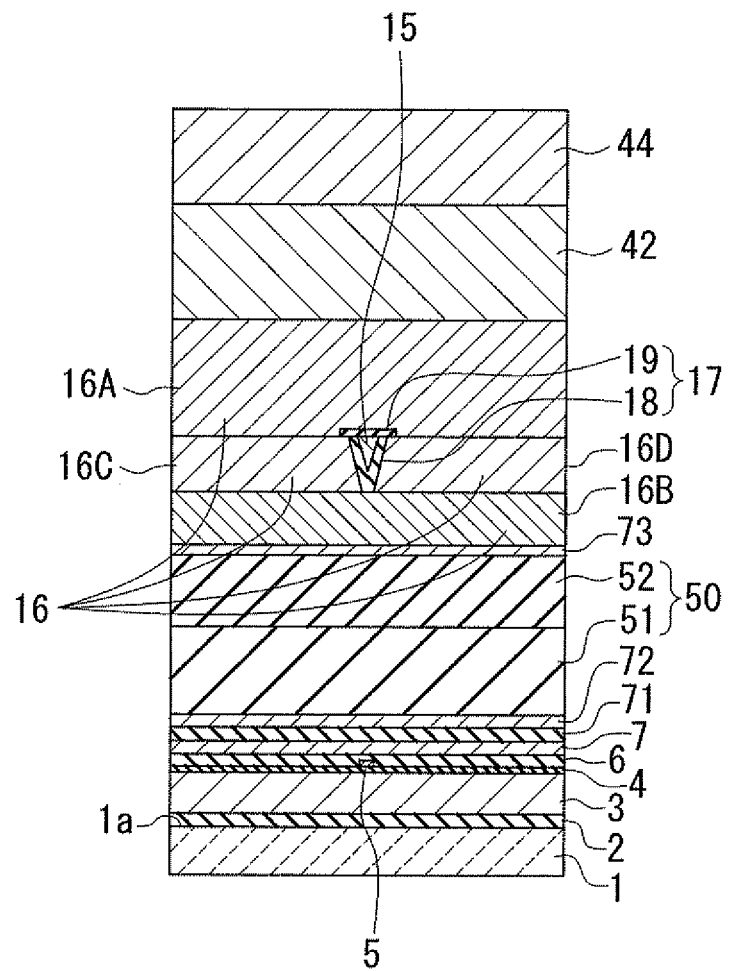

FIG. 22A and FIG. 22B show the next step. In this step, first, the insulating layer 63 is formed over the entire top surface of the stack. The insulating layer 63 is then selectively etched by, for example, IBE, so that the top surfaces of the first shield 16A and the magnetic layer 41 are exposed. Then, the magnetic layer 42 is formed on the first shield 16A and the magnetic layer 43 is formed on the magnetic layer 41 by performing frame plating, for example.

Next, the insulating film 64 is formed over the entire top surface of the stack. The insulating layer 63 and the insulating film 64 are then selectively etched by, for example, IBE, so that the coil connection part 21E (see FIG. 4) of the first layer 21 is exposed. Next, the second layer 22 of the second portion 20 of the coil and the insulating layer 65 are formed. The methods for forming the second layer 22 and the insulating layer 65 are the same as the those for forming the conductive layer 10P and the insulating layer 54. Next, the insulating layer 66 is formed over the entire top surface of the stack. The second layer 22, the insulating layers 65 and 66 and the insulating film 64 are then polished by, for example, CMP, until the top surfaces of the magnetic layers 43 and 43 are exposed.

Next, the insulating layer 67 is formed over the second layer 22, the insulating film 64 and the insulating layer 65. The magnetic layer 44 is then formed over he magnetic layers 42 and 43 and the insulating layer 67 by frame plating, for example.

Figure 23A:
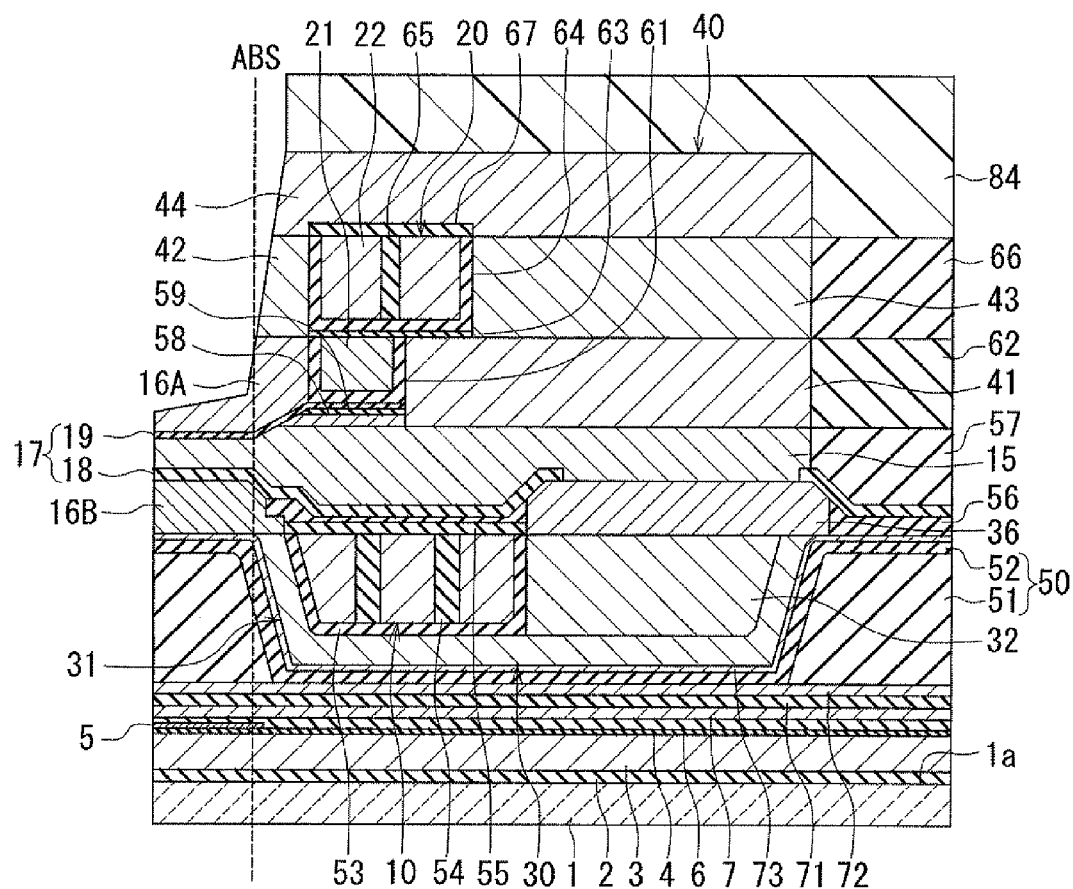
FIG. 23A and FIG. 23B are cross-sectional views showing a step that follows the step shown in FIG. 22A and FIG. 22B.
Figure 23B:
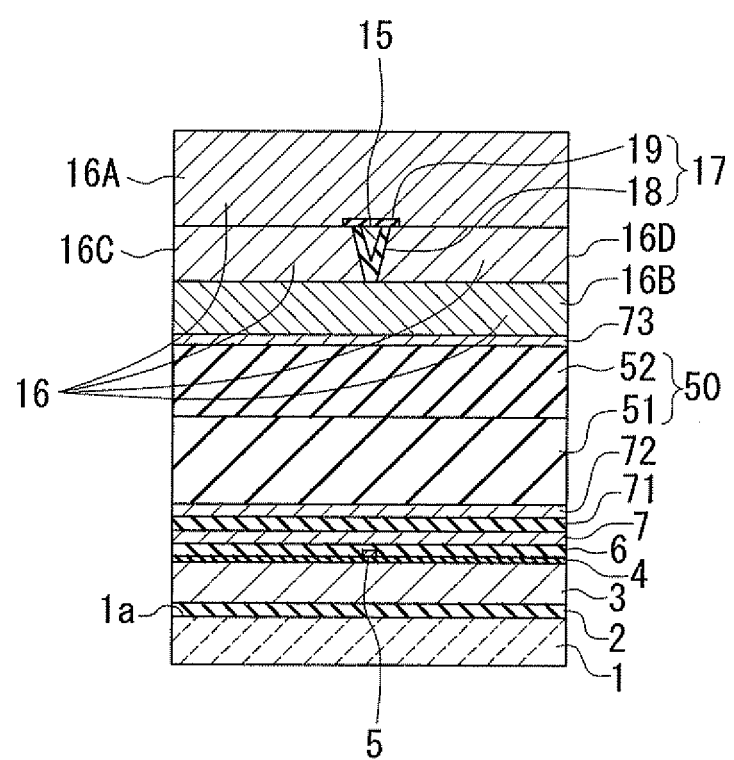

FIG. 23A and FIG. 23B show the next step. In this step, first, a photoresist mask 84 is formed on the top surface of the stack. The photoresist mask 84 is not present in the position ABS at which the medium facing surface 80 is to be formed, but is present on a portion of the stack that is to remain as the magnetic head (the portion located on the right side relative to the position ABS in FIG. 23A) and covers part of the magnetic layer 44. The photoresist mask 84 has an end closest to the position ABS. The distance from this end to the position ABS falls within the range of 0.2 to 0.5 µm, for example.

Using the photoresist mask 84 as an etching mask, the first shield 16A and the magnetic layers 42 and 44 are then etched by IBE, for example. This provides the magnetic layers 42 and 44 with respective end faces facing toward the medium facing surface 80. Furthermore, the first shield 16A is provided with an inclined surface intersecting the position ABS. This inclined surface is to become the connecting surface 16Ad (see FIG. 6) later. The respective end faces of the magnetic layers 42 and 44 and the inclined surface of the first shield 16A formed in this way are contiguous with each other to form one plane. This plane is at an angle of, for example, 10° to 15° relative to the direction perpendicular to the top surface 1a of the substrate 1. The photoresist mask 84 is then removed.

Figure 24A:
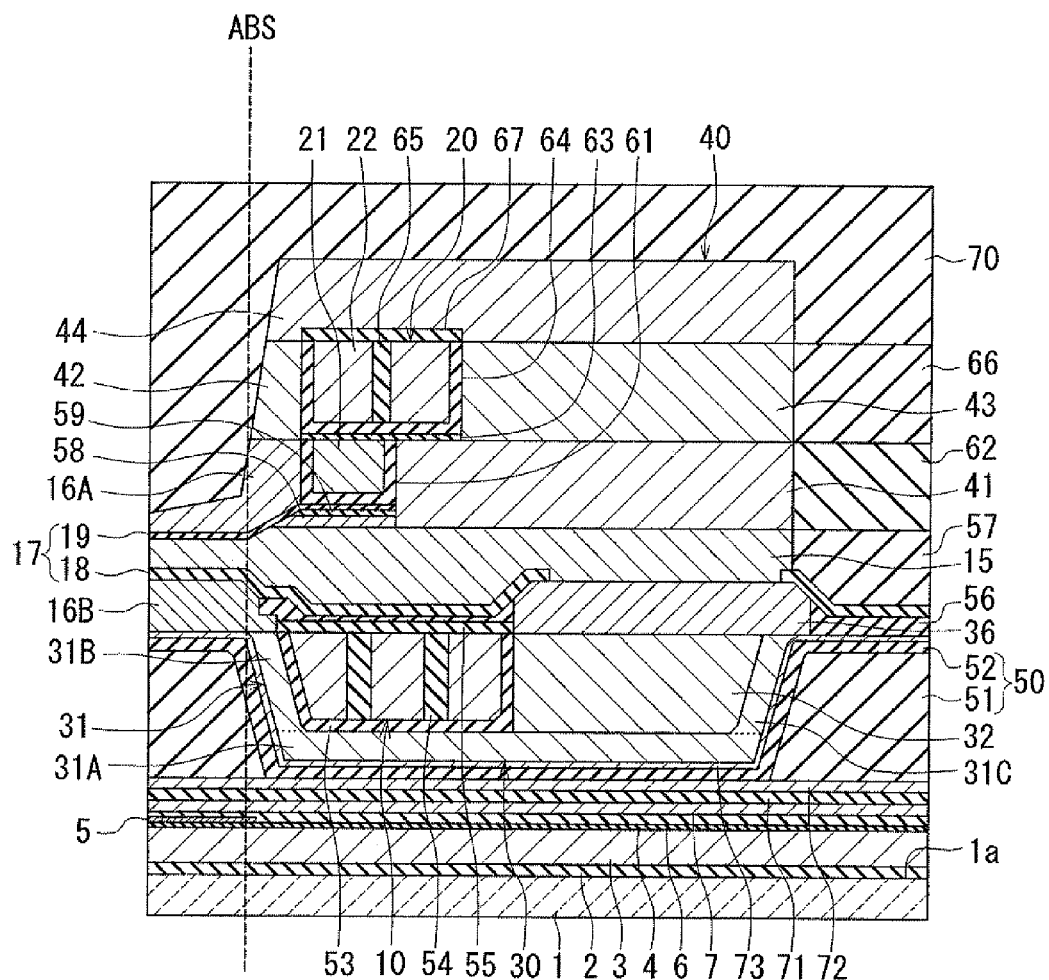
FIG. 24A and FIG. 24B are cross-sectional views showing a step that follows the step shown in FIG. 23A and FIG. 23B.
Figure 24B:
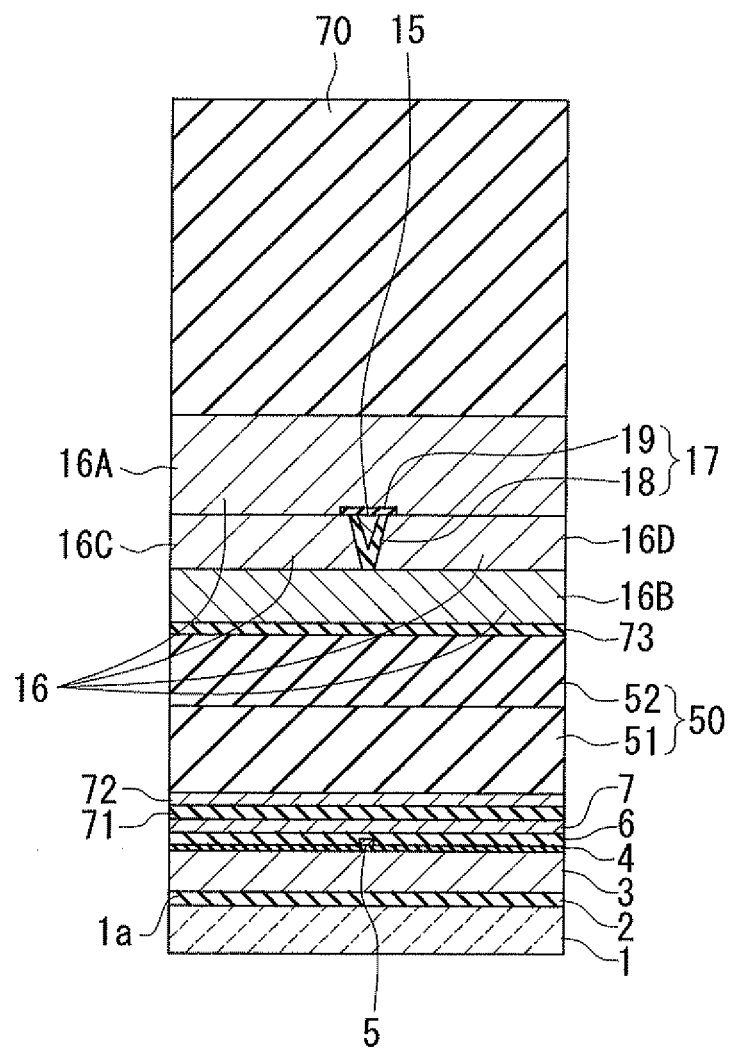

FIG. 24A and FIG. 24B show the next step. In this step, first, the protective layer 70 is formed to cover the entire top surface of the stack. Wiring, terminals and other components are then formed on the protective layer 70, and the substrate 1 is cut near the position ABS at which the medium facing surface 80 is to be formed. The cut surface is polished into the medium facing surface 80, and then fabrication of flying rails and other processes are performed to complete the magnetic head.

As described above, the method of manufacturing the magnetic head according to the present embodiment includes the steps of: forming the accommodation part 50 (the nonmagnetic layer 51 and the nonmagnetic film 52); forming the first return path section 30 (the magnetic layers 31, 32 and 36) after the accommodation part 50 is formed; and forming the coil, the main pole 15, the write shield 16, and the gap part 17 (the first gap layer 19 and the second gap layer 18) after the first return path section 30 is formed. In the present embodiment, the step of forming the first return path section 30 forms the first to third portions 31A, 31B and 31C of the magnetic layer 31 from the same material simultaneously. The present embodiment thus allows the first return path section 30 to be formed in a smaller number of steps than in the case of forming the first to third portions 31A, 31B and 31C of the magnetic layer 31 separately.

Second Embodiment

Figure 25:
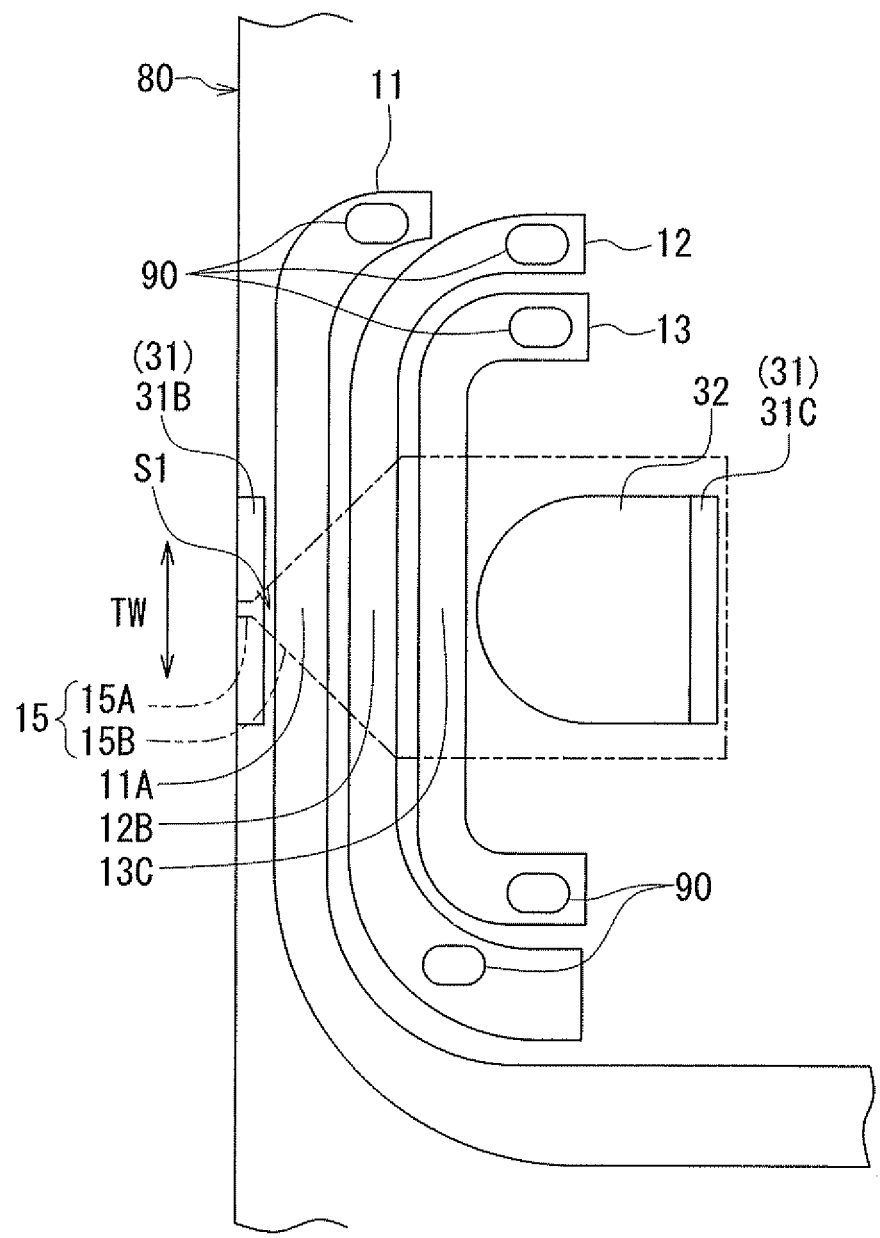
FIG. 25 is a plan view showing a plurality of first coil elements of a coil of a magnetic head according to a second embodiment of the invention.
Figure 26:
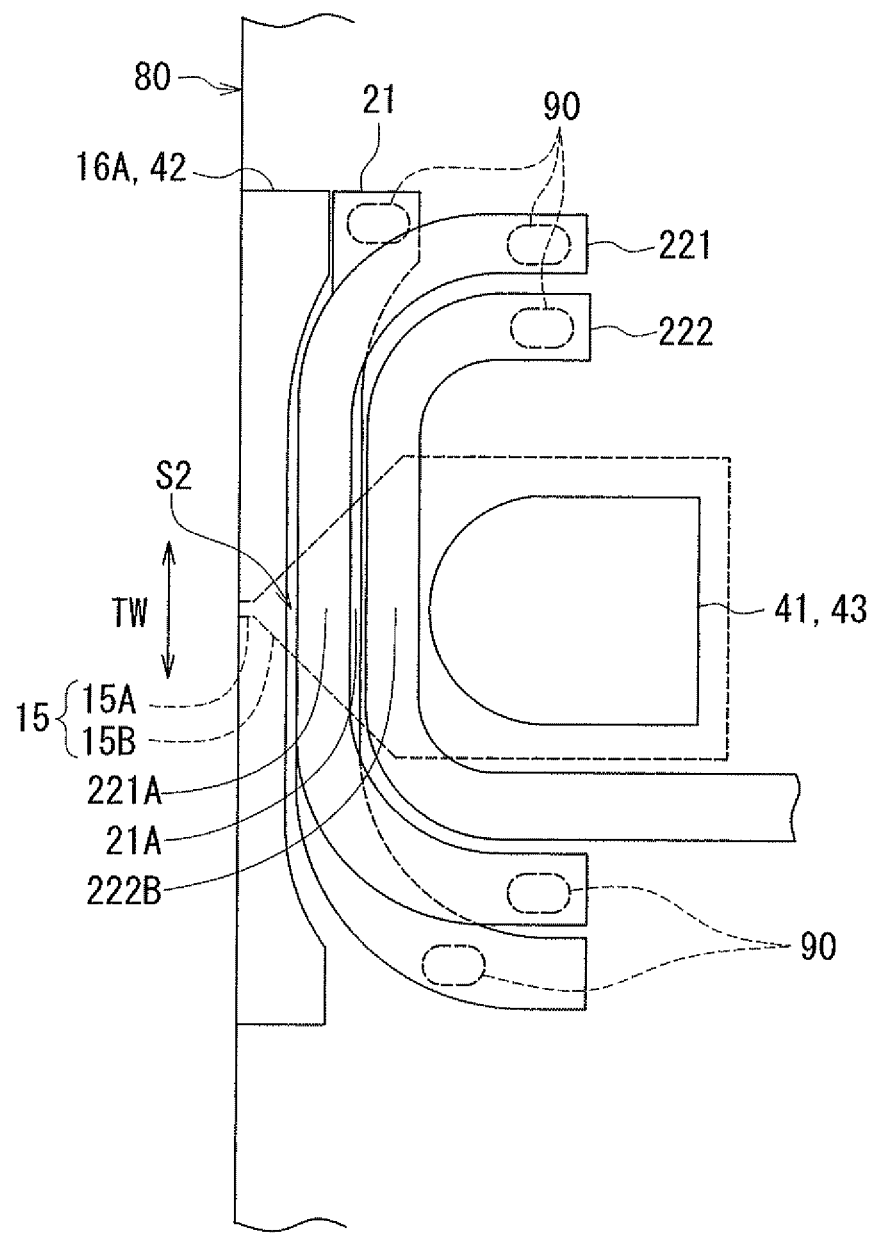
FIG. 26 is a plan view showing a plurality of second coil elements of the coil of the magnetic head according to the second embodiment of the invention.

A magnetic head according to a second embodiment of the invention will now be described with reference to FIG. 25 and FIG. 26. FIG. 25 is a plan view showing a plurality of first coil elements of the coil of the magnetic head according to the present embodiment. FIG. 26 is a plan view showing a plurality of second coil elements of the coil of the magnetic head according to the present embodiment.

The configuration of the magnetic head according to the present embodiment is different from that of the magnetic head according to the first embodiment in the following respects. In the magnetic head according to the present embodiment, the coil is wound approximately three turns around the main pole 15. The coil of the present embodiment has three line-shaped portions 11, 12 and 13 shown in FIG. 25 in place of the first portion 10 of the first embodiment shown in FIG. 3. The coil of the present embodiment further has a first layer 21 shaped as shown in FIG. 26, in place of the first layer 21 of the first embodiment shown in FIG. 4. The coil of the present embodiment further has two line-shaped portions 221 and 222 shown in FIG. 26 in place of the second layer 22 of the first embodiment shown in FIG. 5.

As shown in FIG. 25, the line-shaped portions 11, 12 and 13 respectively include first coil elements 11A, 12B and 13C extending to pass through the first space S1. The first coil elements 11A, 12B and 13C align in this order in the direction perpendicular to the medium facing surface 80, the coil element 11A being closest to the medium facing surface 80.

As shown in FIG. 26, the first layer 21 of the present embodiment includes a second coil element 21A extending to pass through the second space S2. The coil element 21A passes between the first shield 16A and the magnetic layer 41, in particular. As shown in FIG. 26, the line-shaped portions 221 and 222 respectively include second coil elements 221A and 222B extending to pass through the second space S2. The second coil elements 221A and 222B align in this order in the direction perpendicular to the medium facing surface 80, the coil element 221A being closer to the medium facing surface 80. The coil elements 221A and 222B pass between the magnetic layer 42 and the magnetic layer 43, in particular.

The line-shaped portions 11, 12 and 13 are electrically connected to the first layer 21 and the line-shaped portions 221 and 222 via five connection layers 90 of columnar shape, which penetrate a plurality of layers interposed therebetween, so as to form a coil that is wound helically around the main pole 15.

The remainder of configuration, function and effects of the present embodiment are similar to those of the first embodiment.

Third Embodiment

Figure 27:
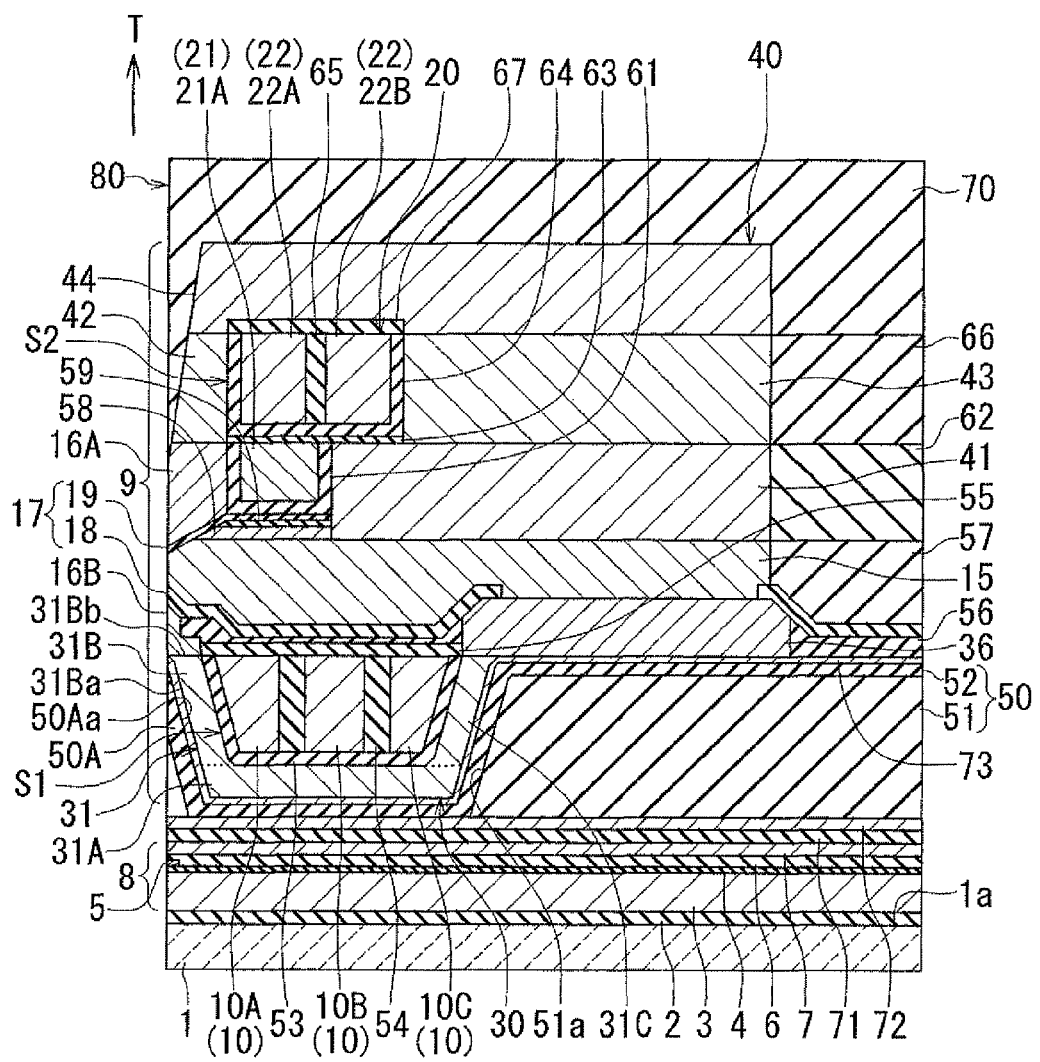
FIG. 27 is a cross-sectional view of a magnetic head according to a third embodiment of the invention.

A magnetic head according to a third embodiment of the invention will now be described with reference to FIG. 27. FIG. 27 is a cross-sectional view of the magnetic head according to the present embodiment. Note that FIG. 27 shows a cross section perpendicular to the medium facing surface and to the top surface of the substrate, or the main cross section, in particular. The magnetic head according to the present embodiment is without the magnetic layer 32. The opening 51a of the nonmagnetic layer 51 constituting the accommodation part 50 and the first portion 31A of the magnetic layer 31 are smaller in size by an amount corresponding to the magnetic layer 32 which is absent. The top end of the third portion 31C of the magnetic layer 31 is connected to the vicinity of the end of the bottom surface of the magnetic layer 36 closest to the medium facing surface 80.

The coil of the present embodiment may be configured to be helically wound around the main pole 15 as in the second embodiment. The remainder of configuration, function and effects of the present embodiment are similar to those of the first or second embodiment.

Fourth Embodiment

Figure 28:
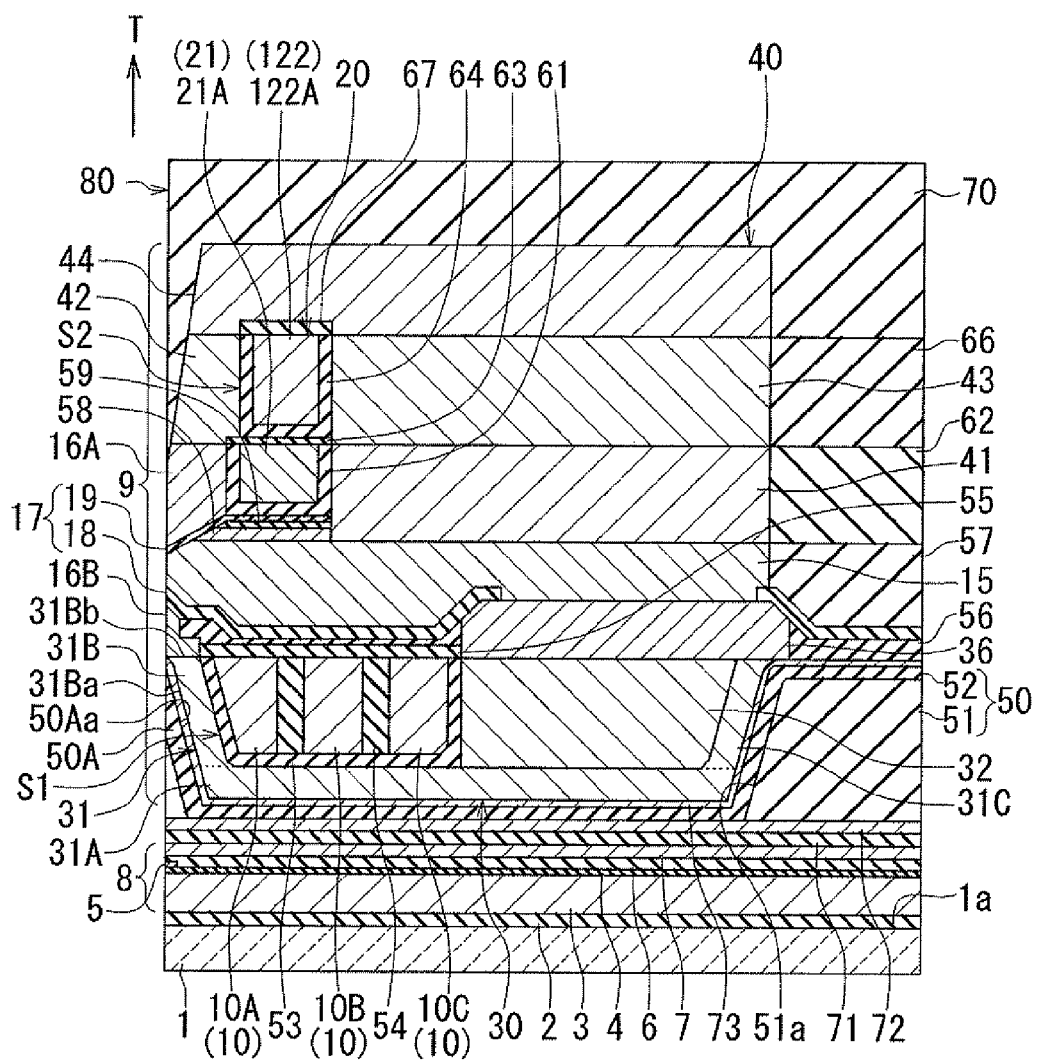
FIG. 28 is a cross-sectional view of a magnetic head according to a fourth embodiment of the invention.
Figure 29:
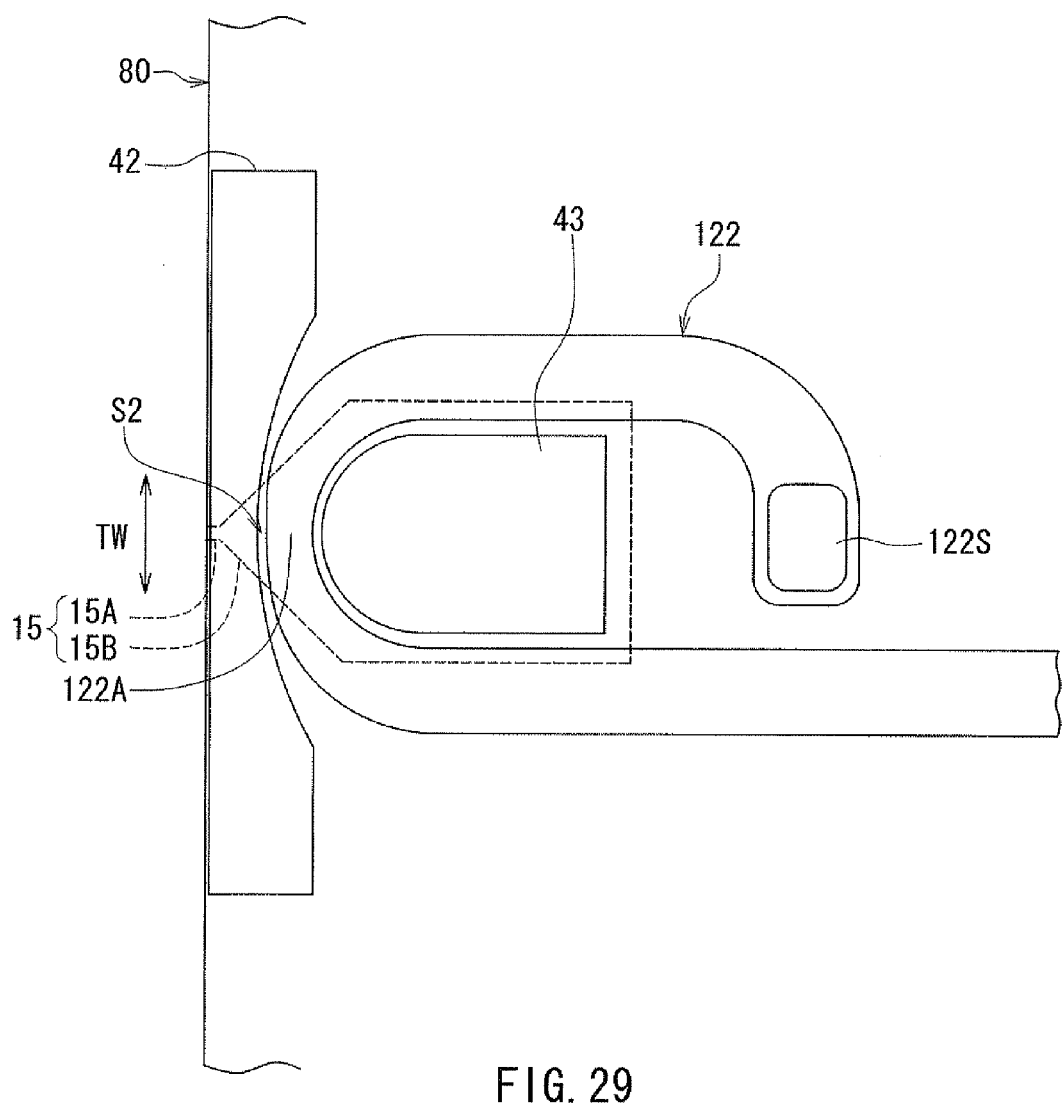
FIG. 29 is a plan view showing a second layer of a second portion of a coil of the magnetic head according to the fourth embodiment of the invention.

A magnetic head according to a fourth embodiment of the invention will now be described with reference to FIG. 28 and FIG. 29. FIG. 28 is a cross-sectional view of the magnetic head according to the present embodiment. Note that FIG. 28 shows a cross section perpendicular to the medium facing surface and to the top surface of the substrate, or the main cross section, in particular. FIG. 29 is a plan view showing a second layer of the second portion of the coil of the magnetic head according to the present embodiment.

The configuration of the magnetic head according to the present embodiment is different from that of the magnetic head according to the first embodiment in the following respects. The second portion 20 of the coil of the present embodiment includes a second layer 122 in place of the second layer 22 of the first embodiment. As shown in FIG. 29, the second layer 122 is wound approximately one turn around the magnetic layer 43 which constitutes part of the second return path section 40. The magnetic head according to the present embodiment is without the insulating layer 65.

As shown in FIG. 29, the second layer 122 includes a second coil element 122A extending to pass between the magnetic layer 42 and the magnetic layer 43, in particular, within the second space S2. The second layer 122 has a coil connection part 122S penetrating the insulating layer 63 and the insulating film 64 and electrically connected to the coil connection part 21E (see FIG. 4) of the first layer 21.

In the present embodiment, the magnetic layer 32 may be omitted as in the third embodiment. The remainder of configuration, function and effects of the present embodiment are similar to those of the first or third embodiment.

The present invention is not limited to the foregoing embodiments, and various modifications may be made thereto. For example, of the first and second return path sections 30 and 40, only the first return path section 30 may be provided in the magnetic head.

Furthermore, as far as the requirements of the appended claims are met, the shapes and locations of the first return path section 30 and the accommodation part 50 are not limited to the examples illustrated in the foregoing embodiments, and may be arbitrarily chosen. For example, in the nonmagnetic layer 51 of the accommodation part 50, the opening 51a may be replaced with a groove having a bottom that is higher in level than the top surface of the middle shield layer 72. In this case, the nonmagnetic film 52 may be omitted.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A method of manufacturing a magnetic head for perpendicular magnetic recording, the magnetic head comprising:
    a medium facing surface that faces a recording medium;
    a coil that produces a magnetic field corresponding to data to be written on the recording medium;
    a main pole that has an end face located in the medium facing surface, the main pole allowing a magnetic flux that corresponds to the magnetic field produced by the coil to pass, and producing a write magnetic field for writing the data on the recording medium by means of a perpendicular magnetic recording system;
    a write shield made of a magnetic material and having an end face located in the medium facing surface;
    a gap part made of a nonmagnetic material and interposed between the main pole and the write shield;
    a first return path section made of a magnetic material;
    an accommodation part made of a nonmagnetic material and accommodating at least part of the first return path section; and
    a substrate having a top surface, wherein:
    the coil, the main pole, the write shield, the gap part, the first return path section, and the accommodation part are located above the top surface of the substrate;
    the end face of the write shield includes: a first end face portion located on a front side in a direction of travel of the recording medium relative to the end face of the main pole; and a second end face portion located on a rear side in the direction of travel of the recording medium relative to the end face of the main pole;
    the first return path section is located on the rear side in the direction of travel of the recording medium relative to the main pole and lies between the main pole and the top surface of the substrate, the first return path section connecting the write shield and part of the main pole away from the medium facing surface to each other so that a first space is defined by the main pole, the gap part, the write shield, and the first return path section;
    the coil includes at least one first coil element extending to pass through the first space; and
    the first return path section includes a magnetic layer including a first, a second, and a third portion, wherein the first portion is located closer to the top surface of the substrate than is the first space, the second portion is located closer to the medium facing surface than is the first space, and the third portion is located farther from the medium facing surface than is the first space,
    the method comprising the steps of:
    forming the accommodation part;
    forming the first return path section after the accommodation part is formed; and
    forming the coil, the main pole, the write shield and the gap part after the first return path section is formed,
    wherein the step of forming the first return path section forms the first to third portions from the same material simultaneously.

2. The method of manufacturing the magnetic head for perpendicular magnetic recording according to claim 1, wherein the step of forming the first return path section forms the first to third portions by frame plating.

3. The method of manufacturing the magnetic head for perpendicular magnetic recording according to claim 1, wherein:
    the accommodation part includes an interposer interposed between the second portion and the medium facing surface;
    the interposer has an inclined surface facing toward the second portion;
    a distance from the medium facing surface to an arbitrary point on the inclined surface decreases with increasing distance from the arbitrary point to the top surface of the substrate; and
    the second portion extends along the inclined surface.

4. The method of manufacturing the magnetic head for perpendicular magnetic recording according to claim 3, wherein the interposer is made of an inorganic insulating material.

5. The method of manufacturing the magnetic head for perpendicular magnetic recording according to claim 3, wherein the inclined surface forms a first angle of 5° to 45° relative to a direction perpendicular to the top surface of the substrate.

6. The method of manufacturing the magnetic head for perpendicular magnetic recording according to claim 3, wherein:
    the second portion has a first end face facing toward the medium facing surface and a second end face in contact with the write shield;
    the first end face has an end located in the medium facing surface; and
    when seen at the end of the first end face, the first end face forms a second angle greater than 90° relative to a part of the medium facing surface, the part of the medium facing surface being located on the front side in the direction of travel of the recording medium relative to the end of the first end face.

7. The method of manufacturing the magnetic head for perpendicular magnetic recording according to claim 6, wherein the second angle is equal to 180° minus the first angle.

8. The method of manufacturing the magnetic head for perpendicular magnetic recording according to claim 6, wherein the second angle is smaller than 180° minus the first angle.

9. The method of manufacturing the magnetic head for perpendicular magnetic recording according to claim 1, wherein:
- the magnetic head further comprises a second return path section located on the front side in the direction of travel of the recording medium relative to the main pole, the second return path section connecting the write shield and part of the main pole away from the medium facing surface to each other so that a second space is defined by the main pole, the gap part, the write shield, and the second return path section;
- the coil further includes at least one second coil element extending to pass through the second space; and
- the method further comprises the step of forming the second return path section after the main pole is formed.

10. The method of manufacturing the magnetic head for perpendicular magnetic recording according to claim 1, wherein the end face of the write shield further includes a third end face portion and a fourth end face portion, the third end face portion and the fourth end face portion being located on opposite sides of the end face of the main pole in a track width direction.

* * * * *